(12) United States Patent
Hullot et al.

(10) Patent No.: US 7,346,705 B2
(45) Date of Patent: Mar. 18, 2008

(54) METHOD OF SYNCHRONISING THREE OR MORE ELECTRONIC DEVICES AND A COMPUTER SYSTEM FOR IMPLEMENTING THAT METHOD

(75) Inventors: Jean-Marie Hullot, Bougival (FR); Bertrand Guiheneuf, Paris (FR); Laurent Cerveau, Paris (FR); Eric Noyau, Morsang (FR)

(73) Assignee: Apple Inc., Cupertino, CA (US)

( * ) Notice: Subject to any disclaimer, the term of this patent is extended or adjusted under 35 U.S.C. 154(b) by 768 days.

(21) Appl. No.: 10/453,051

(22) Filed: Jun. 2, 2003

(65) Prior Publication Data

US 2004/0044920 A1 Mar. 4, 2004

Related U.S. Application Data

(60) Provisional application No. 60/409,521, filed on Sep. 9, 2002.

(51) Int. Cl.
*G06F 9/00* (2006.01)
*G06F 15/16* (2006.01)

(52) U.S. Cl. ............ 709/238; 709/203; 709/248; 455/436; 455/442; 370/324

(58) Field of Classification Search ........... 709/201, 709/238, 224, 227, 248, 203; 707/203; 455/436, 442; 370/324, 510
See application file for complete search history.

(56) References Cited

U.S. PATENT DOCUMENTS

| | | | |
|---|---|---|---|
| 4,937,743 A | 6/1990 | Rassman et al. | |
| 5,129,057 A | 7/1992 | Strope et al. | |
| 5,247,438 A | 9/1993 | Subas et al. | |
| 5,323,314 A | 6/1994 | Baber et al. | |
| 5,371,844 A | 12/1994 | Andrew et al. | |
| 5,457,476 A | 10/1995 | Jenson | |
| 5,500,938 A | 3/1996 | Cahill et al. | |

(Continued)

FOREIGN PATENT DOCUMENTS

EP 0276427 A2 8/1988

(Continued)

OTHER PUBLICATIONS

F. Dawson and D. Stenerson: "Internet Calendaring and Scheduling Core Object Specification (iCalendar)", Network Working Group, Request for Comments: 2445, Nov. 1998.

(Continued)

*Primary Examiner*—Khanh Dinh
(74) *Attorney, Agent, or Firm*—Blakely, Sokoloff, Taylor & Zafman LLP

(57) ABSTRACT

Methods, systems and machine readable media for synchronising three or more electronic devices.

In one exemplary method of synchronising three or more electronic devices, said method comprises:
  a) selecting at least one category of record for synchronisation;
  b) storing an original value and a changed value of each changed record from a selected record category;
  c) establishing an electronic connection between at least two devices;
  d) comparing the records of the selected record categories;
  e) determining any changed record;
  f) identifying the updated device with the changed record having an original value the same as the value of the record in the other previous device; and
  g) changing the value of the record in the previous device to the changed value.

27 Claims, 18 Drawing Sheets

U.S. PATENT DOCUMENTS

| | | | |
|---|---|---|---|
| 5,528,745 | A | 6/1996 | King et al. |
| 5,619,637 | A | 4/1997 | Henshaw et al. |
| 5,621,458 | A | 4/1997 | Mann et al. |
| 5,621,876 | A | 4/1997 | Odam et al. |
| 5,634,100 | A | 5/1997 | Capps |
| 5,659,768 | A | 8/1997 | Forbes et al. |
| 5,664,063 | A | 9/1997 | Johnson et al. |
| 5,761,646 | A | 6/1998 | Frid-Nielsen et al. |
| 5,805,163 | A | 9/1998 | Bagnas |
| 5,838,889 | A | 11/1998 | Booker |
| 5,842,009 | A | 11/1998 | Borovoy et al. |
| 5,855,006 | A | 12/1998 | Huemoeller et al. |
| 5,860,067 | A | 1/1999 | Onda et al. |
| 5,895,451 | A | 4/1999 | Yamade et al. |
| 5,899,979 | A | 5/1999 | Miller et al. |
| 5,960,406 | A | 9/1999 | Rasansky et al. |
| 6,039,355 | A | 3/2000 | Durand |
| 6,064,975 | A | 5/2000 | Moon et al. |
| 6,073,110 | A | 6/2000 | Rhodes et al. |
| 6,085,166 | A | 7/2000 | Beckhardt et al. |
| 6,101,480 | A | 8/2000 | Conmy et al. |
| 6,167,379 | A | 12/2000 | Dean et al. |
| 6,222,549 | B1 | 4/2001 | Hoddie |
| 6,243,325 | B1 | 6/2001 | Tomono |
| 6,278,456 | B1 | 8/2001 | Wang et al. |
| 6,369,840 | B1 | 4/2002 | Barnett et al. |
| 6,380,959 | B1 | 4/2002 | Wang et al. |
| 6,466,236 | B1 | 10/2002 | Pivowar et al. |
| 6,486,894 | B1 | 11/2002 | Abdelhadi et al. |
| 6,604,079 | B1 | 8/2003 | Ruvolo et al. |
| 6,728,530 | B1 | 4/2004 | Heinonen et al. |
| 6,738,789 | B2 * | 5/2004 | Multer et al. ............... 707/201 |
| 6,785,868 | B1 | 8/2004 | Raff |
| 6,868,426 | B1 | 3/2005 | Mankoff |
| 7,007,041 | B2 * | 2/2006 | Multer et al. ............... 707/201 |
| 7,039,596 | B1 | 5/2006 | Lu |
| 7,047,011 | B1 * | 5/2006 | Wikman ................... 455/442 |
| 2001/0044805 | A1 * | 11/2001 | Multer et al. ............... 707/201 |
| 2001/0049617 | A1 | 12/2001 | Berenson et al. |
| 2002/0010807 | A1 * | 1/2002 | Multer et al. ............... 709/328 |
| 2002/0040369 | A1 * | 4/2002 | Multer et al. ............... 707/201 |
| 2002/0131565 | A1 | 9/2002 | Scheuring et al. |
| 2002/0178060 | A1 * | 11/2002 | Sheehan .................... 705/14 |
| 2002/0184321 | A1 | 12/2002 | Fishman et al. |
| 2002/0191035 | A1 | 12/2002 | Selent |
| 2002/0196280 | A1 | 12/2002 | Bassett et al. |
| 2003/0045301 | A1 | 3/2003 | Wollrab |
| 2003/0050986 | A1 | 3/2003 | Matthews et al. |
| 2003/0065677 | A1 | 4/2003 | Culp et al. |
| 2003/0065742 | A1 | 4/2003 | Culp et al. |
| 2003/0163537 | A1 | 8/2003 | Rohall et al. |
| 2004/0039779 | A1 | 2/2004 | Amstrong et al. |
| 2004/0073615 | A1 | 4/2004 | Darling |
| 2004/0125142 | A1 | 7/2004 | Mock et al. |
| 2004/0215572 | A1 | 10/2004 | Uehara et al. |
| 2005/0125737 | A1 | 6/2005 | Allen et al. |
| 2005/0222971 | A1 | 10/2005 | Cary |
| 2006/0053043 | A1 | 3/2006 | Clarke |

FOREIGN PATENT DOCUMENTS

| | | |
|---|---|---|
| WO | WO 00/62146 A1 | 10/2000 |
| WO | WO 00/62201 A1 | 10/2000 |
| WO | WO 01/49051 A1 | 7/2001 |
| WO | WO 02/44958 A1 | 6/2002 |
| WO | WO 02/089026 A2 | 11/2002 |

OTHER PUBLICATIONS

B. Mahoney, G. Babics, A. Taler: "Guide to Internet Calendaring", Network Working Group, Request for Comments: 3283, Jun. 2002.

PCT International Search Report for PCT International Appln No. US03/28247, mailed Feb. 13, 2004 (6 pages).

PCT Written Opinion for PCT International Appln No. US03/28247, mailed Aug. 16, 2004 (5 pages).

PCT International Preliminary Examination Report for PCT International Appln No. US03/28247, mailed Feb. 25, 2005 (6 pages).

PCT International Search Report for PCT International Appln No. US03/28053, mailed Jun. 18, 2004 (5 pages).

PCT Written Opinion for PCT International Appln No. US03/28053, mailed Sep. 16, 2004 (5 pages).

PCT International Preliminary Examination Report for PCT International Appln No. US03/28053, mailed Mar. 3, 2005 (6 pages).

Beard, et al. "A Visual Calendar for Scheduling Group Meetings," Proceeding of the 1990 ACM Conference on Computer-Supported Cooperative Work, Oct. 1990, pp. 279-290.

Timecruiser Computer Corporation, "Timecruiser User Guide," version 1.5, Jul. 1998, downloaded on Aug. 3, 2005 at https://www.atd.net/timecruiser/doc, pp. 1-50.

Bisignano, Mario et al., "Expeerience: a Jxta middleware for mobile ad-hoc networks", Proceedings of the third International Conference on Peer-to-Peer Computing (P2P'03) 2003 IEEE, 2 pages.

Paluska, Justin Mazzola et al., "Footloose: A Case for Physical Eventual Consistency and Selective Conflict Resolution", Proceedings of the Fifth IEEE Workshop on Mobile Computing Systems & Applications (WMCSA 2003) 2003 IEEE, 10 pages.

Prasad, Sushil K. et al., "Enforcing Interdependencies and Executing Transactions Atomically Over Autonomous Mobile Data Stores Using SyD Link Technology", Proceedings of the 23rd International Conference on Distributed Computing Systems Workshops (ICDCSW'03) 2003 IEEE, 7 pages.

Prasad, Sushil K. et al., "Implementation of a Calendar Application Based on SyD Coordination Links", Proceedings of the International Parallel and Distributed Processing Symposium (IPDPS'03) 2003 IEEE, 8 pages.

PCT Notification of Transmittal of the International Search Report and Written Opinion of the International Searching Authority, or the Declaration, for the PCT Int'l. Appln. No. US2005/014619, mailed Sep. 2, 2005, (11 pages).

VAitA, OsaSync Frequently Asked Questions, Feb. 4, 2004, http://web.archive.org/web/20040204195815/http://www.vaita.com/faq.asp.

WindowsITPro, Replying To And Forwarding Messages, Jun. 6, 2003 http://web.archive.org/web/20030625191716/http://www.windowsitlibrary.com/Content/191/11/2.html.

Supplementary European Search Report for EP Application No. 03794665.4, dated Aug. 30, 2006 (3 pages).

PCT International Preliminary Examination Report for PCT International Appln. No. US2005/014619, mailed Dec. 7, 2006 (7 pages).

* cited by examiner

FIG. 16

METHOD OF SYNCHRONISING THREE OR MORE ELECTRONIC DEVICES AND A COMPUTER SYSTEM FOR IMPLEMENTING THAT METHOD

This application is related to and hereby claims the benefit of the filing date of U.S. Provisional Patent Application Ser. No. 60/409,521, filed Sep. 9, 2002, which application is hereby incorporated herein by reference.

The present invention relates to a method of synchronising three or more electronic devices and a computer system for implementing that method. In particular but not exclusively those electronic devices may include personal computers, computer servers, personal digital assistants and mobile telephones. Moreover, synchronisation occurs for a selected category of record which may include, but not exhaustively, computer programs and data comprising calendar, email, audio, graphic, notes and personal information such as contact lists, names, addresses, telephone numbers, e-mail addresses etc.

At present many consumers have many such electronic devices. Typically a consumer may have a personal computer at work, one at home, a notebook or personal digital assistant and a mobile telephone. Moreover, it is very common to have the same record on more than one device. However, it is a rare occurrence for all of those devices to be present simultaneously. Thus, whenever a change occurs to a record, that record must be changed on each of the electronic devices. This leads inherently to errors being introduced not only when effecting the change but also ensuring that all of the devices have been updated.

It has been proposed to provide a method of synchronisation between two devices. The proposal achieves synchronisation by comparing the selected records between the two devices and updating the previous device. However, although it has been desired to synchronise more than two devices, it has not been possible due to difficulties encountered such as when not all of the devices are present or when there are conflicting changes which have been effected across each of the devices.

SUMMARY OF THE DESCRIPTION

Certain embodiments of the present invention are directed towards a method of synchronising three or more electronic devices and a computer system.

One exemplary embodiment of the present invention relates to a method of synchronising three or more electronic devices, said method comprising the steps of:
a) selecting at least one category of record for synchronisation;
b) storing an original value and a changed value of each changed record from a selected record category;
c) establishing an electronic connection between at least two devices;
d) comparing the records of the selected record categories;
e) determining any changed record;
f) identifying the updated device with the changed record having an original value the same as the value of the record in the other previous device; and
g) changing the value of the record in the previous device to the changed value.

The present invention also relates to a computer system comprising three or more electronic devices and a computer program arrange to implement the method as claimed in any one the attached claims.

The foregoing method is facilitated, in one exemplary embodiment, through the use of a computer system having a computer program operative on a computer such as one of the Macintosh personal computers from the applicant, Apple Computer Inc. of Cupertino, Calif., USA. More preferably the computer program is operative in the MacOS x version 10.2, known as Jaguar (Registered Trade Mark). Moreover, the computer program is complementary to Mail and Address Book computer applications also available from Apple for full personal information management. The computer program of this particular embodiment is compatible with printing applications and functions.

In addition, the computer program of this particular embodiment is compliant with standards for calendaring applications such as iCal and vCal (both Registered Trade Marks) and may allow import of data from other applications like Entourage (Registered Trade Mark) available from Microsoft. Further details can be obtained from http://www.imc.org/draft-ietf-calsch-inetcal-guide. The computer program of this particular embodiment is also compatible with the iTools web service available from Apple in order to share calendar data easily over the Internet.

In view of the compatibility discussed above and in particular with the operating system, the computer program of this particular embodiment may enable copy and paste with other applications, drag and drop facilities, use of the spellchecker, integration with email applications and integration with address applications for management of personal information.

BRIEF DESCRIPTION OF THE DRAWINGS

Embodiments of the present invention will now be described by way of further example only and with reference to the accompanying drawings, in which:

Figure 16:
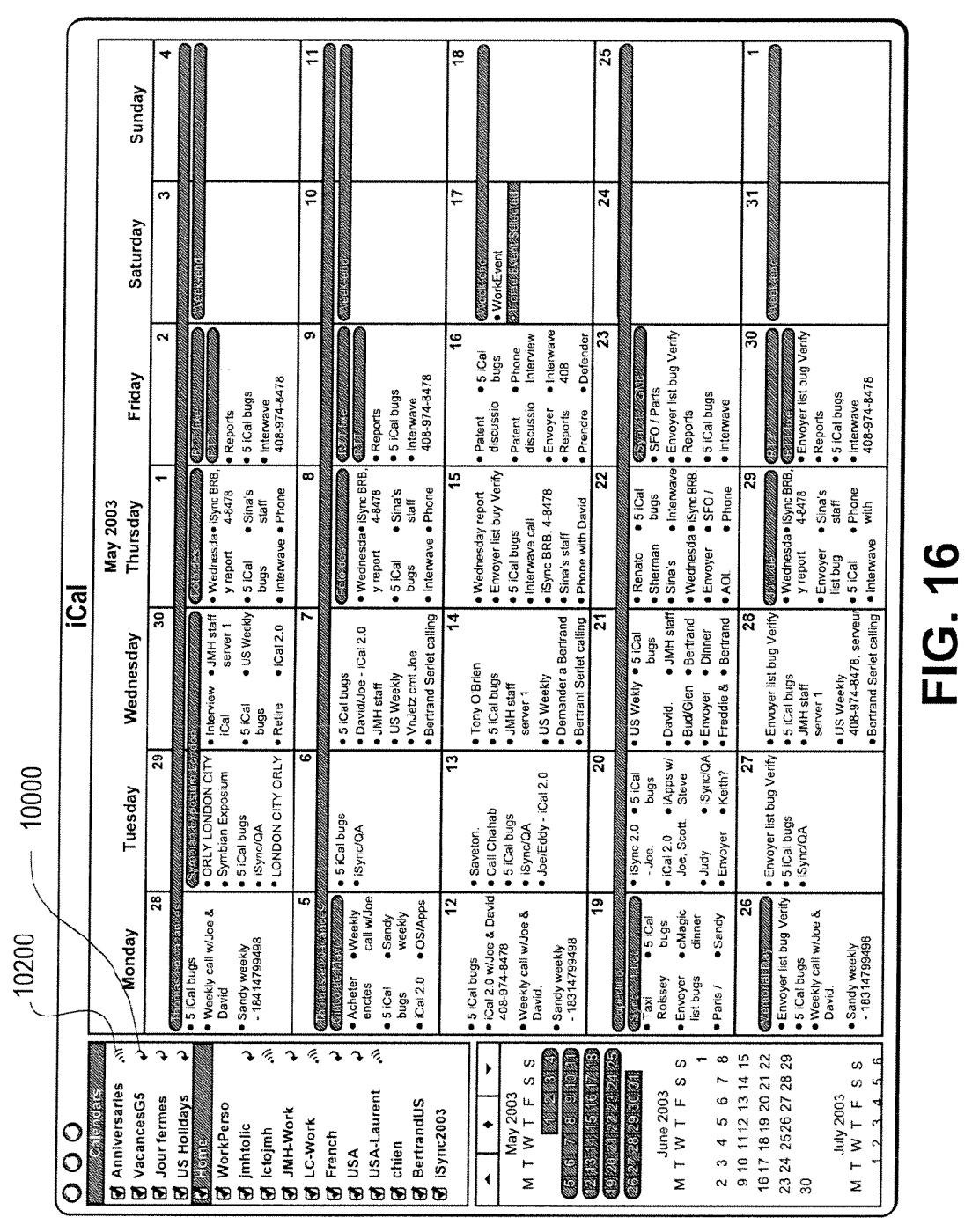

FIG. 16 is a diagram of a user interface of the calendar computer program illustrating to do items;

DETAILED DESCRIPTION

Embodiments of the present invention relate to calendar operations on a data processing system. A data processing system which may be used with embodiments of the invention typically include a display for displaying a calendar interface and a processor for controlling the display and an input device. Examples of such data processing systems include general purpose computers or special purpose computers or personal digital assistants or cellular telephones. Examples of data processing systems are shown and described in U.S. Pat. No. 6,222,549 which is hereby incorporated herein by reference. Often, the data processing system will include a memory for storing software (e.g. computer program) instructions. Embodiments of the invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device (addressable through a network). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor of a data processing system.

A machine readable media can be used to store software and data which when executed by a data processing system causes the system to perform various methods of the present invention. This executable software and data may be stored in various places including for example ROM, volatile RAM, non-volatile memory and/or cache. Portions of this software and/or data may be stored in any one of these storage devices.

Thus, a machine readable media includes any mechanism that provides (i.e., stores and/or transmits) information in a form accessible by a machine (e.g. a computer, network device, personal digital assistant, manufacturing tool, any device with a set of one or more processors, etc.). For example, a machine readable media includes recordable/non-recordable media (e.g. read only memory (ROM); random access memory (RAM); magnetic disk storage media; optical storage media; flash memory devices; etc.) as well as electrical, optical, acoustical or other forms of propagated signals (e.g. carrier waves, infrared signals, digital signals, etc.); etc.

Figure 1A:
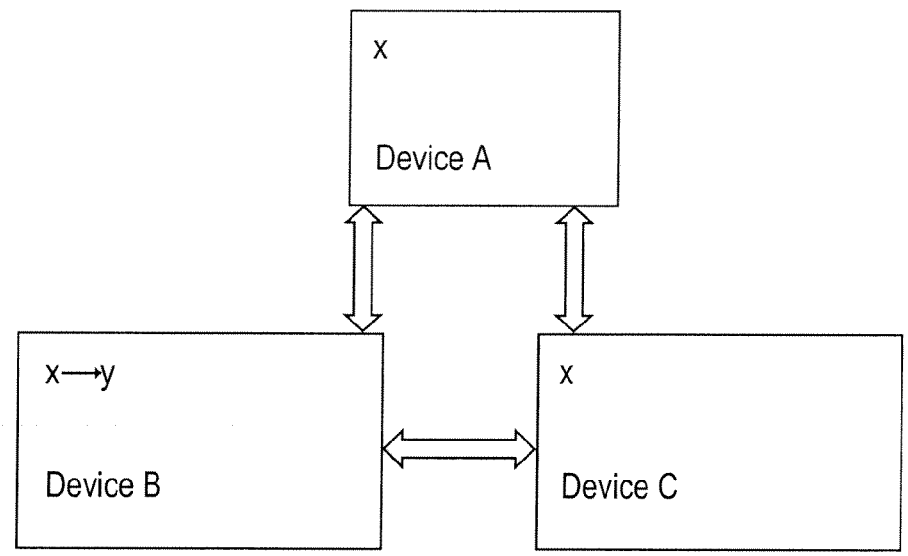
FIG. 1a is a simplistic schematic diagram of three devices which may be synchronised according to the present invention.
Figure 1B:
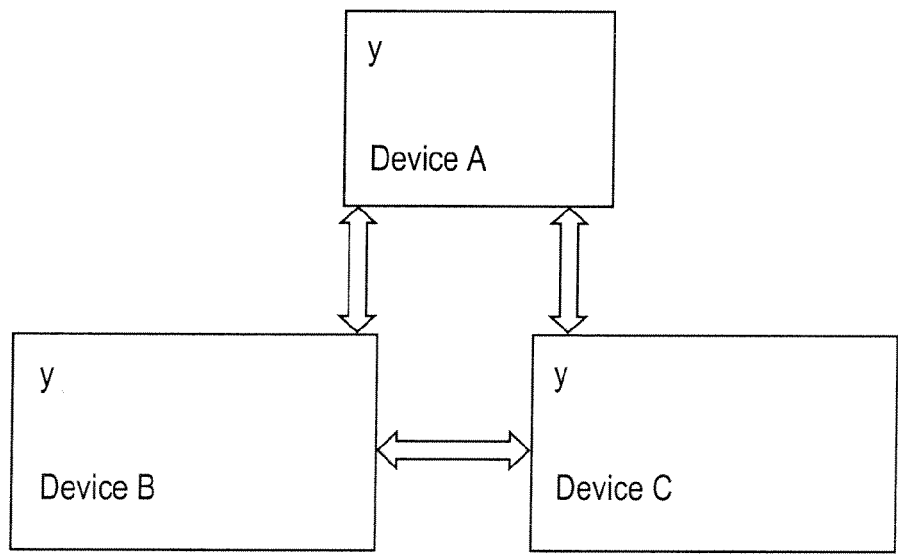
FIG. 1b is the schematic diagram of FIG. 1a after synchronisation.

A preferred embodiment of the present invention will first be described with reference to FIGS. 1a, 1b and 2.

Figure 2:
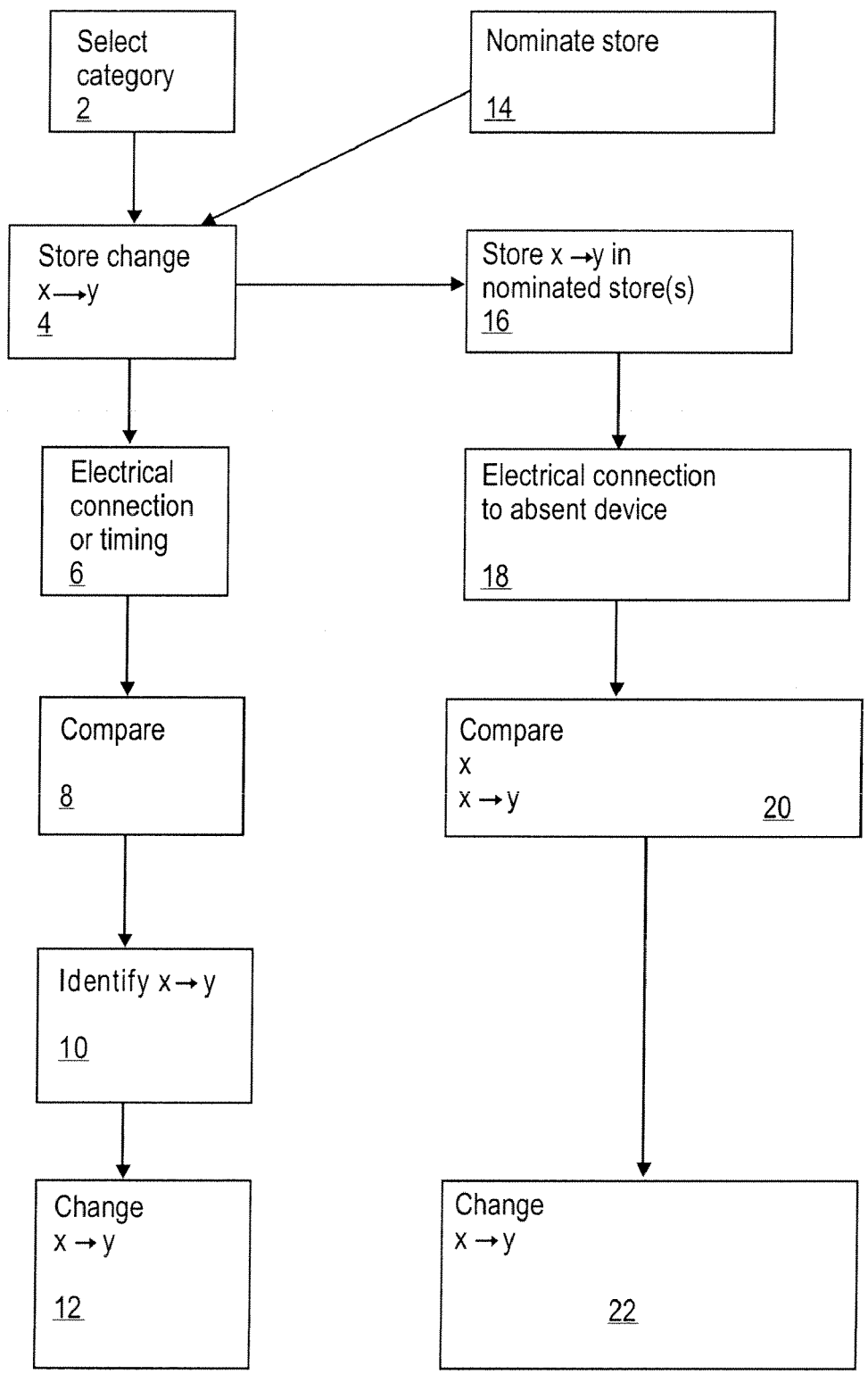
FIG. 2 is a flow diagram according to a preferred embodiment of the present invention.

In the first instance as shown in FIG. 2, a user selects the record categories for synchronisation in operation 2. FIG. 1a is a schematic diagram of three electronic devices A, B, C each having a record of a record category selected for synchronisation. The record has an original value x. In device B, the value has changed from x→y and the original value x and the changed value y is stored by device B as shown in operation 4. It is determined that there is an electrical connection between the three devices in operation 6.

In operation 8, the record is compared across devices A, B and C to determine any such changed records. In operation 10, the record in device B is identified and the original value x is identified as being the same value in devices A and C. Thus the values of the records in devices A and C are changed to the changed value y in operation 12. This is shown schematically in FIG. 1b.

Since all of the devices involved in synchronisation are present, there is now no need to retain the original value x and changed value y in each device.

All of the devices may be present in circumstances such as the devices forming a local area network and so connected permanently. More commonly, the devices are not electrically connected such as when one device in a local area network is not turned on or when synchronising with a mobile telephone which may not be in range. In this case, a store is nominated for each device in operation 14 so that the changes for the absent device can be stored therein in operation 16. When an electrical connection is established with the absent device in operation 18, then the stored original value x is compared with the value in the absent device in operation 20. If the compared values are the same, then the value of the record is changed in the absent device in operation 22. The change stored in the store for the absent device can then be deleted.

Figure 3:
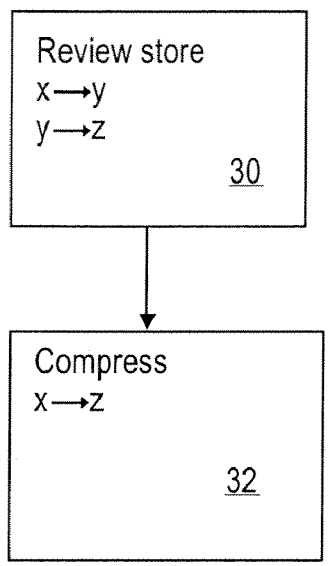
FIG. 3 is a flow diagram of compression of the changes according to the present invention.

When there are many changes or when the absent device is only brought into electrical connection occasionally, then the nominated store for the absent device may contain too many changes. The preferred embodiment enables such stores to be compressed. As shown in FIG. 3, each store is reviewed periodically in operation 30. The review seeks to detect at least two changes whereby the changed value of the first change is the same as the original value of the second change. That is to say:

x→y
y→z

In operation 32, the two changes are compressed to form a compressed change comprising the original value of the first change and the changed value of the second change. That is to say:

x→z

The compression review occurs periodically over a time period which may be set by the user or initiated on instructions from the user.

Figure 4:
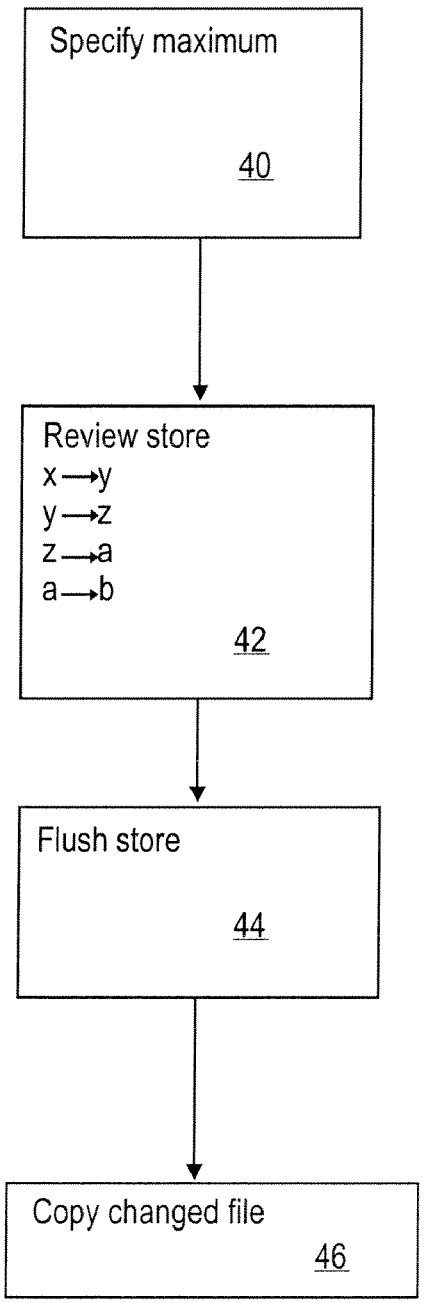
FIG. 4 is a flow diagram of flushing a store according to the present invention.

Nonetheless, there may still be too many changes stored in a store for a respective absent device. Thus, as shown in FIG. 4, the preferred embodiment enables the store to be flushed of all changes and the device uploaded by copying the record involved rather than each of the changed values. In operation 40, a user specifies a maximum number of changes for compression. Each store is reviewed in operation 42 to identify all of the changes whereby the changed value of the previous change is the same as the original value of the subsequent change. For example, x→y
y→z
z→a
a→b If the number of changes exceeds the maximum number specified, then the store is flushed of each of the changes in operation 44. A flag is set instead to copy the whole record rather than just the changed values and the record is copied in operation 46.

Figure 5:
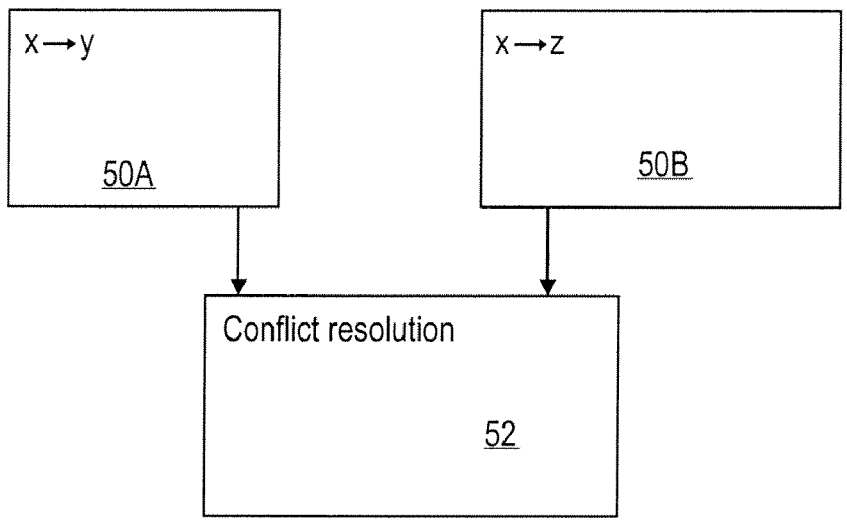
FIG. 5 is a flow diagram illustrating conflict resolution.

As discussed in the prior art, it is possible and not uncommon for two devices to be changed in different ways. For example as shown in FIG. 5, device A has a record (e.g. as stored in a file) changed from x→y in operation 50A and device B from x→z in operation 50B. In this case, it is not clear which is the correct change to effect. Thus, in operation 52, both changes are passed for conflict resolution.

Figure 6:
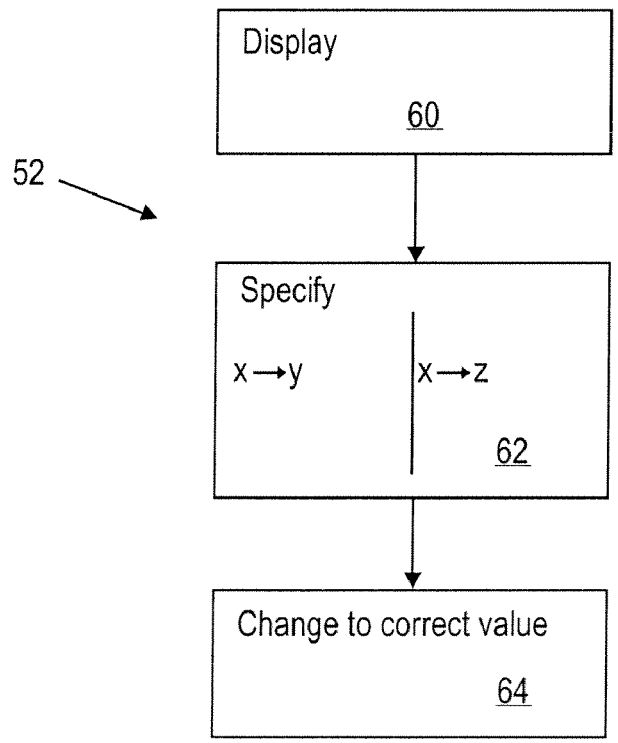
FIG. 6 is a flow diagram of conflict resolution according to the present invention.

FIG. 6 illustrates the conflict resolution 52 in more detail. A user is advised of the conflict either as a pop-up overriding the matter outstanding on the device or when termination of the device is predicted or at periodic times specified by the user or initiated on instructions from the user. At whatever timing, the conflicting changes are displayed in operation 60. A user is required to specify the correct change in operation 62. The value on the incorrect device is then changed to the correct value in operation 64.

The foregoing method may be implemented by a computer system including three or more electronic devices and a computer program installed on each of the devices for effecting the synchronisation method. A user interface is provided as part of the computer program for interacting with the user.

Figure 7:
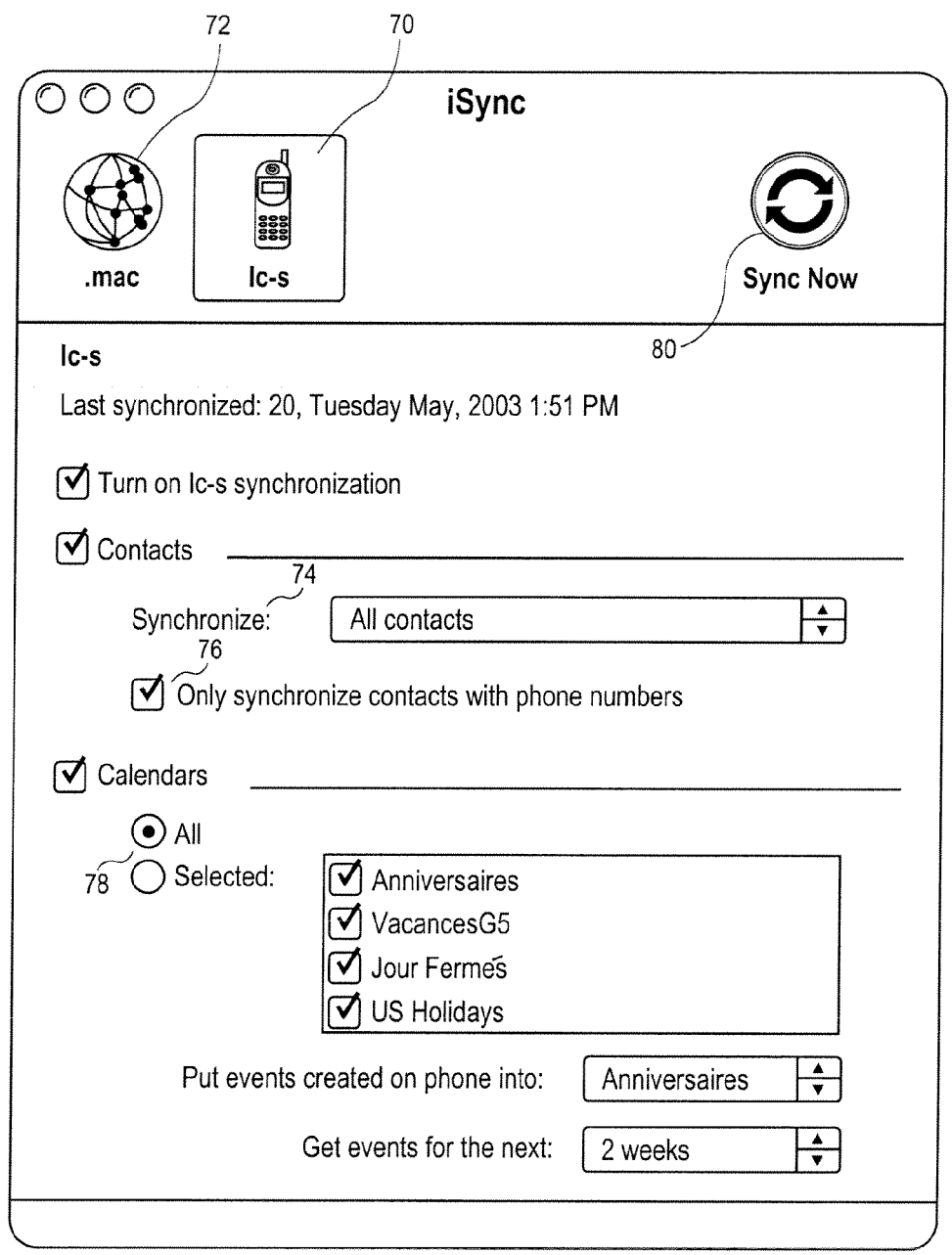
FIG. 7 is a user interface for effecting the synchronisation method of the preferred embodiment when facilitated by a computer program.

A user interface of the preferred embodiment when facilitated by a computer program is shown in FIG. 7. In this case, an electronic device of a mobile telephone 70 is proposed for synchronisation to a computer indicated at 72. The category of record chosen is personal information known as "contacts" in 74 and moreover, only those with telephone numbers at 76. The contact personal information with telephone numbers is thus being synchronised with all of the calendars held in the calendar computer program on the computer at 78. A user effects button 80 to initiate the synchronisation.

Figure 8:
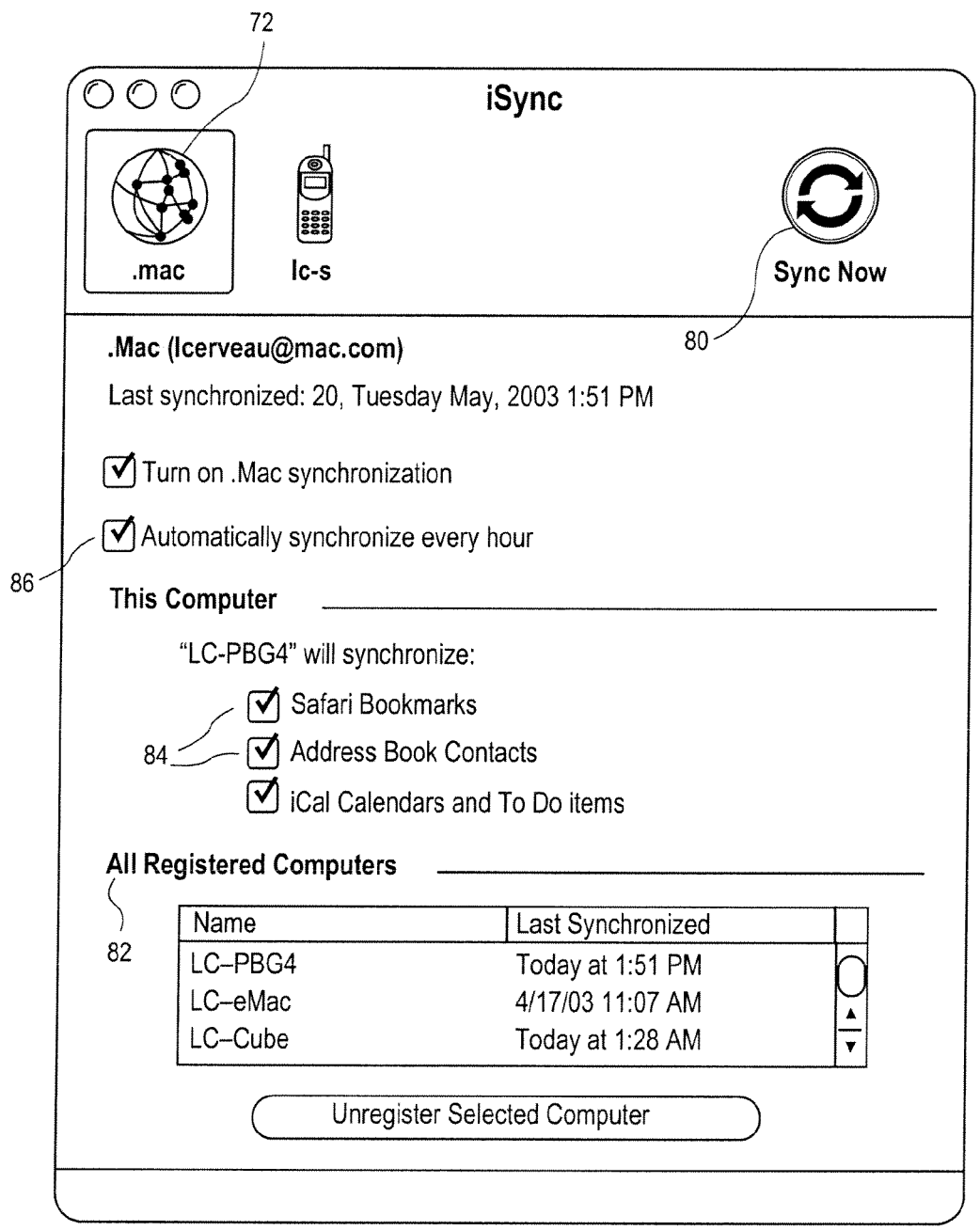
FIG. 8 is a user interface for effecting the synchronisation method of the preferred embodiment when facilitated by a computer program.

In FIG. 8, the user interface indicates that the computer 72 may be synchronised with other electronic devices in the synchronised group at 82. The categories of records being synchronised are selected with buttons 84. The user may also set the period between synchronisation using button 86.

Figure 9:
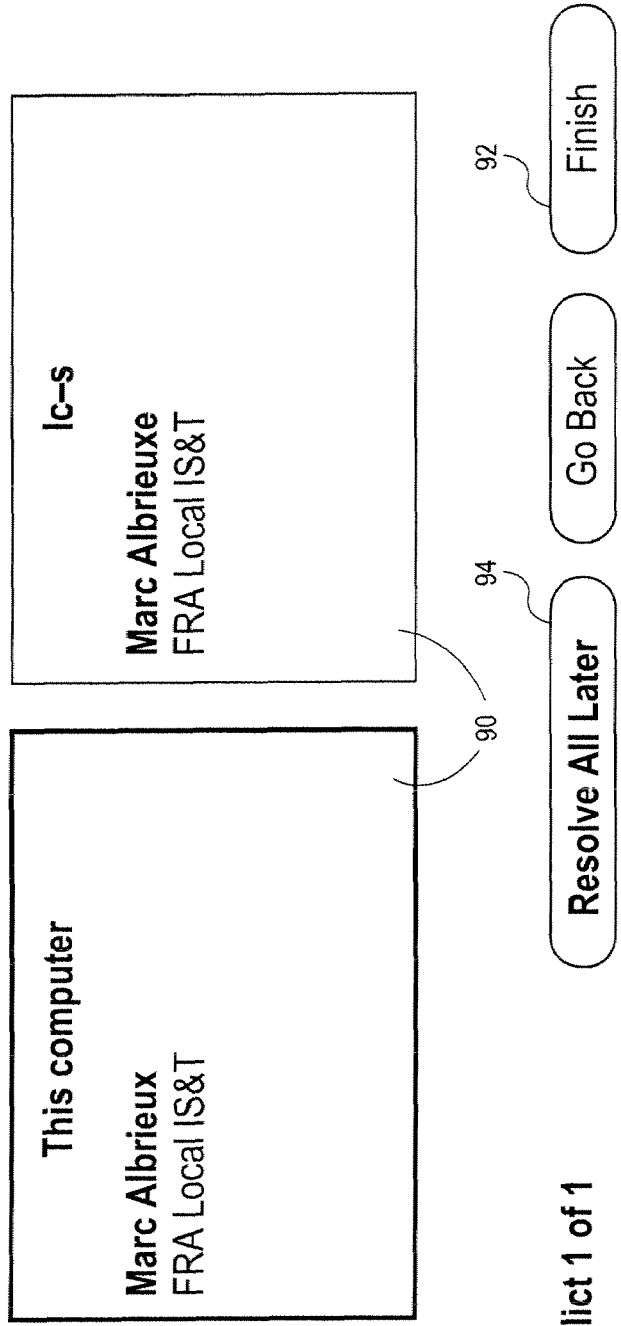
FIG. 9 is a user interface illustrating conflict resolution.

Having initiated the synchronisation method using button 80, a conflict may be identified and provided on a user interface as shown in FIG. 9. The user interface provides two windows 90, each window relating to one of the devices involved in the synchronisation with the changed value of each indicated. A user selects a correct changed value by highlighting the correct window and initiating the conflict resolution by clicking on the "Finish" button 92. In this case, there is a conflict between the spelling of the contact name. A user may defer the conflict resolution by clicking on the button "resolve all later" 94.

Figure 10:
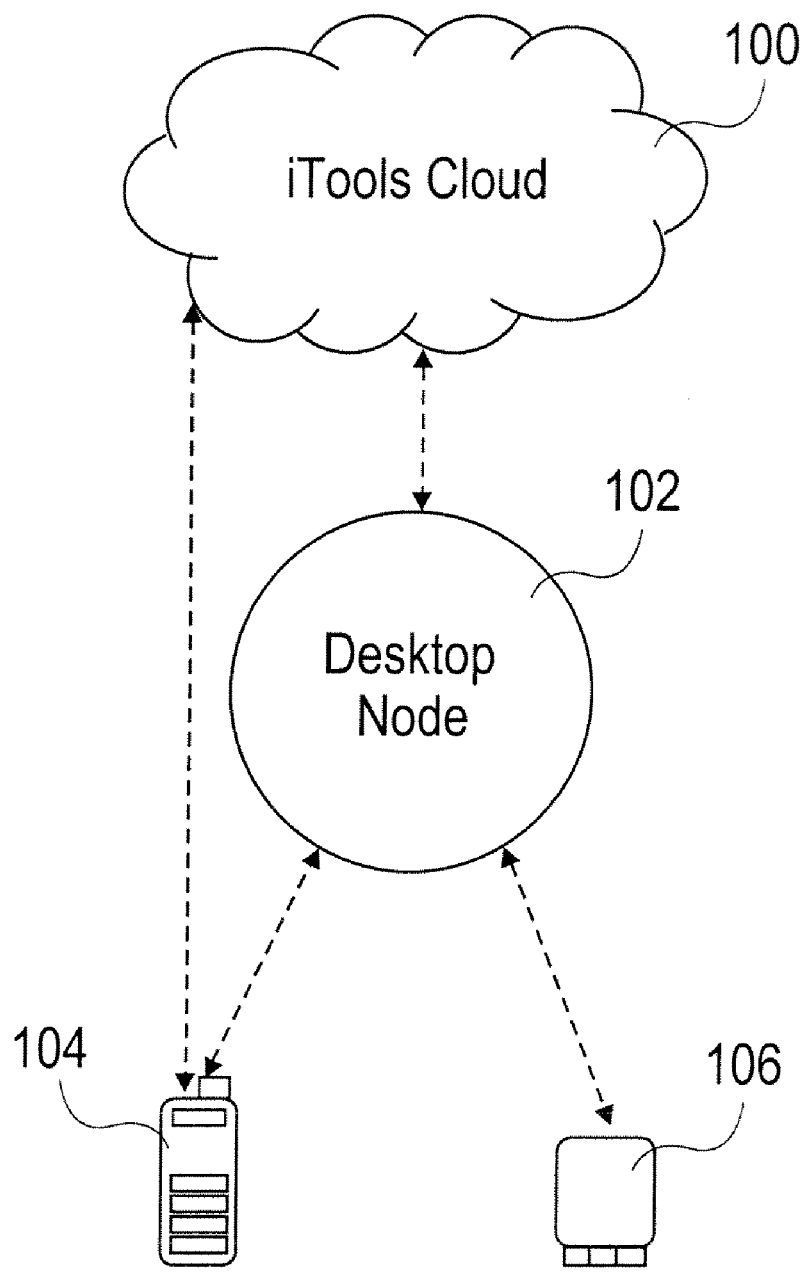
FIG. 10 is a schematic diagram illustrating a preferred connection arrangement of various devices according to the present invention.

As more and more devices are included in the synchronisation method, the complexity of how the electronic devices are synchronised increases dramatically. FIG. 10 is a schematic diagram of a preferred embodiment of the computer system implementing the synchronisation method. In FIG. 10, an internet server 100 is connected to a desktop computer 102 which in turn is connected to a mobile telephone 104 and a personal digital assistant 106.

When all of the connections are made, each device is synchronised with each other according to the method discussed above. If any connections are lost or are only periodic, then the changed device stores the changed value in the nominated store for updating the absent device when the next connection is made, also according to the method discussed above. If there are any conflicts which have not been resolved or if the user is undertaking the conflict resolution when the connection is broken, then the conflicts are batched for resolution once the connection is re-established.

Figure 11:
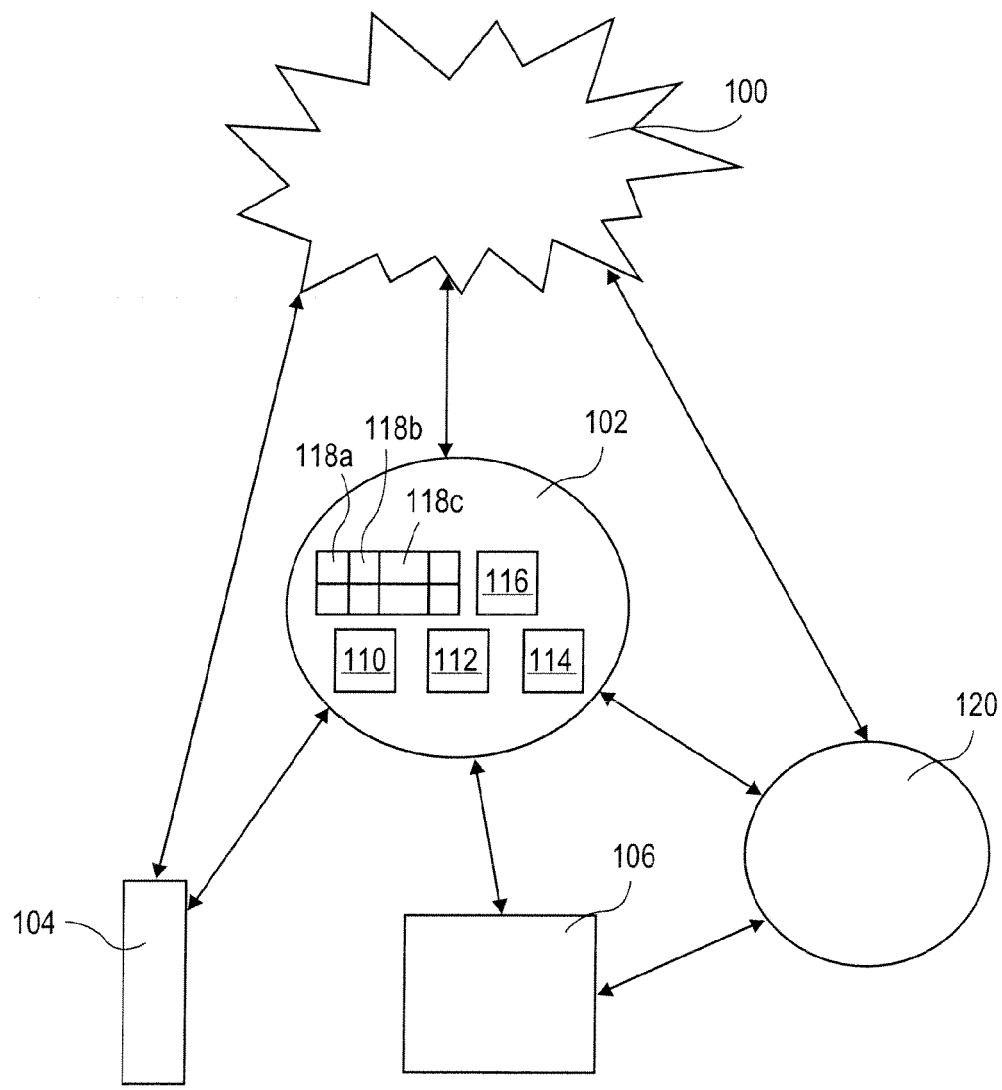
FIG. 11 is a schematic diagram illustrating the complexity of connecting and synchronisation a plurality of devices according to the present invention.

In FIG. 10, the desktop computer and/or the internet server each include features for driving the method. When the method is implemented by a computer system such as shown in FIG. 10, those features may be provided either as hardware or software or a combination. Thus, as shown in FIG. 11, the computer system for at least the desktop includes a connection node 110 for determining when a connection has been made to a respective device; a scheduler 112 for determining when synchronisation is to occur; a comparison engine 114 for comparing the records in the selected categories; an update engine 116 for effecting the changes to the identified records; and a nominated device store 118 a, b, c etc for each device which may be absent.

The computer system uses these features to implement the synchronisation method as follows. The connection mode establishes that a connection has been made and notifies the scheduler. If the scheduler advises that synchronisation is to occur, then the synchronisation is commenced. The comparison engine compares the records of the selected record categories to determine any changed records and identifying that the change can be effected and the update engine effects the change.

The computer system also preferably has such features in the internet server 100 and depending upon processing power and storage space, such features or at least some may be provided on the other devices such as the mobile telephone and PDA. As discussed above, some devices are only connected periodically. The present invention enables each device to be responsible for connection to another device in the synchronisation group and for maintaining details of those other devices which are absent. Either device must then store the changes in a nominated store for each absent device. Moreover, this enables each device to be able to manage its own heuristic of synchronisation and for setting the optimum maximum number of changes before flushing.

In any case, the features of the computer system are facilitated by the user interface as discussed above and as shown in any one of FIGS. 7 to 9. The user interface, when provided on each device, enables the preferences for each device and/or connection method to be set as a default value(s) or by the user. That is to say, the timing of the synchronisation may be set by a user such as when first going on line, then synchronize or when first turning the computer or device on then synchronize, or when coming into range if the device has a wireless connection then synchronize, or setting a period between synchronisations such as every two hours.

FIG. 10 illustrates a preferred embodiment. However, even with the arrangement of the connection as shown in FIG. 10, there are a number of scenarios in which synchronisation may be achieved as follows:

1. The mobile telephone is connected to the computer and uses that connection to be synchronised with the Internet server and the computer is not in the synchronisation group.
2. The mobile telephone is connected to the computer and is synchronised with both the computer and the Internet server. This scenario is particularly advantageous since only one synchronisation step is required and is most efficient in both storage space, interaction with the user and processing power.
3. The mobile telephone is connected to the computer and is synchronised with the computer. However, the computer is not connected to the Internet server. Thus, the changed values are stored on the computer for synchronisation with the Internet server at a later date.
4. The mobile telephone synchronises directly with the Internet server through wireless connection and may or may not be connected to the computer which is not connected to the Internet server. If the computer is also part of the synchronisation group, then the computer will need to be synchronised with the mobile telephone or Internet server at a later date. This scenario is particularly problematic and known as a "triangle" problem".

The triangle problem needs to address a number of issues, namely:
1. Redundant device synchronisation as in scenario 4 with the mobile telephone connected to the computer, since the mobile telephone synchronises with the Internet server and the computer is synchronised subsequently with either the mobile telephone or the Internet server.
2. Identical records coming from more than one place which could generate duplicates such as in scenario 3 when the computer is connected to the Internet and so is the mobile telephone.
3. Updated values which are out of step.

One embodiment of the present invention solves this triangle problem by having fast synchronisation predetermined for one side of the triangle and the other side which completes the triangle is only allowed to effect slow synchronisation and each system maintains meta-data for the records being synchronised. In the preferred embodiment, fast synchronisation is set for any wireless communication between the mobile telephone and the Internet server with slow synchronisation set if the mobile telephone is also connected to the computer. The meta-data for records at a device is used to keep track of what decisions were made when the records were synchronised at the device. The meta-data itself can be synchronised in order to solve the triangle problem.

With regard to scenario 1, where the computer does not form part of the synchronisation group, the present invention enables the computer to be used as an intermediary for synchronisation between other devices. The data of either device involved in the synchronisation is not stored in the intermediary.

FIG. 11 illustrates further increased complexity in the synchronisation method and implemented by the computer system according to the present invention. In this case, the computer 102 is connected intermittently to the Internet server 100, the mobile telephone 104 is connected to the Internet server 100 intermittently via a wireless connection and via a hardware connection to the computer 102, an additional computer 120 is connected to the computer 102 in a local area network and to the Internet server 100 but is not part of the synchronisation group and the personal digital assistant is connected to the computer 102 and the additional computer 120.

The synchronisation method and computer system as discussed above enables records or files to be synchronised across the various devices 100, 102, 104 and 106 in spite of the complexity. It is to be noted that the additional computer 120 is not part of the synchronisation group as discussed above and merely acts as an intermediary for the PDA and Internet server.

The complexity of the synchronisation method and computer system is readily appreciated and the triangle problem and issues involved in solving the triangle problem become particularly acute. None the less, the present invention meets that complexity and solves the triangle problem through the method and computer system according to the present invention. In particular, the method includes, in an exemplary embodiment, establishing the electrical connections of each of the devices and for those which are absent, maintaining a store of the changes; compressing those changes where possible; flushing the stores when too large and copying the records or files rather than updating the individual changes; providing conflict resolutions if arising; allowing fast synchronisations in preference to slow synchronisations to avoid the triangle problem; and enabling detailed and flexible preferences to be set for determining a hierarchy of connections and the timing of the synchronisation.

Any electronic device may be involved as listed in the non exhaustive list given in the opening paragraph, namely personal computers, computer servers, personal digital assistants and mobile telephones. Personal digital assistants include various models of the Palm (Registered Trade Mark) device from Palm Inc. Mobile telephones include the T681, T608, T610 and P800 from Sony Ericsson (Registered Trade Mark), T720 from Motorola (Registered Trade Mark), S55 from Siemens (Registered Trade Mark) and 7650 and 3650 from Nokia (Registered Trade Marks). Moreover, the electronic devices may include personal music devices such as the iPod (Registered Trade Mark) available from Apple Computer Inc.

Any record or file may be selected for synchronisation again as discussed in the opening paragraph, namely, computer programs and data comprising calendar, email, audio, graphic, notes and personal information such as contact lists, names, addresses, telephone numbers, e-mail addresses. If the data is in a standard electronic format, then records or files from applications such as AddressBook, Mail, iChat and Instant Messaging can be selected. The synchronisation of data is particularly suited to records or files of the category known as "stickies". Stickies are short notes in an electronic format from Apple Computer, Inc. but other such notes may be suitable. Depending upon the electronic device involved any suitable electronic connection may be made as is well known in the art including USB, serial ports, firewire, bluetooth, infrared and over the Internet.

Bluetooth connections use two different strategies for synchronisation. These are "IrMC sync profile" and "SyncML". Needless to say the method of synchronisation is compatible with these strategies and any others.

Moreover, synchronisation is facilitated if the records are stored in a predetermined area on each electronic device.

As discussed any record may be selected for synchronisation. One type of record which is particularly suited for synchronisation is data relating to a calendar. Computer programs conforming to standards are particularly suitable. Such a standard can be found in libical at http:www.softwarestudio.org/libical. A computer program for a plurality of calendars which is particularly suitable is described in our other co-pending application filed on the same day by the same inventors and entitled "A Computer Program Comprising A Plurality Of Calendars," Application Ser. No. 10/453,234. Although this co-pending application is incorporated herein by reference, relevant details of this application are described below.

Figure 12:
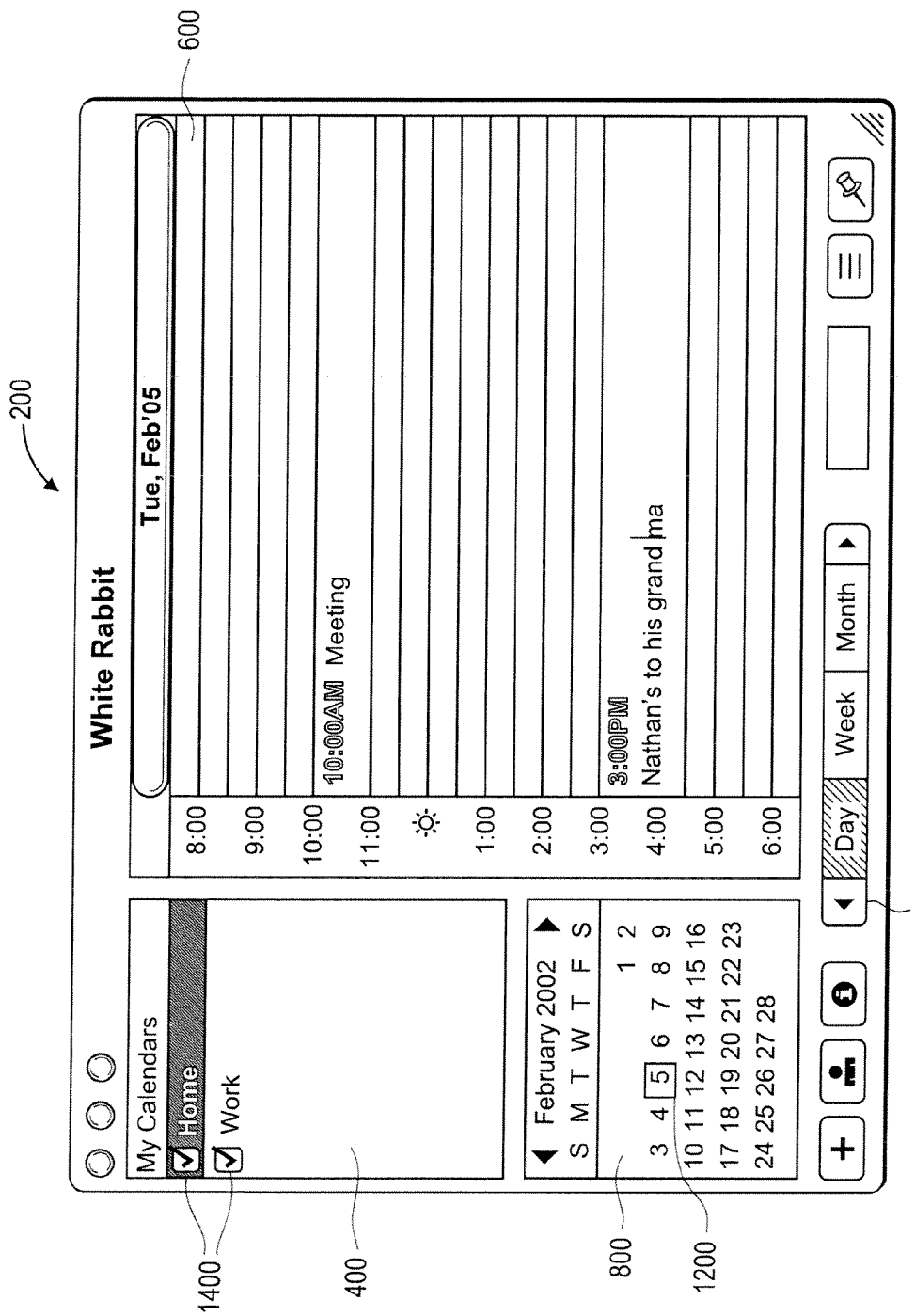
FIG. 12 is a diagram of a user interface according to the calendar computer program which may be synchronised by present invention.

The calendar computer program has a user interface providing an interface for two or more calendars and the events from the two or more calendars may be selectively displayed simultaneously in a single calendar interface. FIG. 12 is a diagram of such a user interface 200. The user interface includes a number of windows 400, 600 and 800. Window 400 is titled "My Calendars". FIG. 12 illustrates the use of the user interface with two calendars, namely "Home" and "Work". The names of the calendars are displayed in the "My Calendars" window. Preferably, the calendars "Home" and "Work" are created by default. Other calendars may be included, especially public event calendars.

Figure 13:
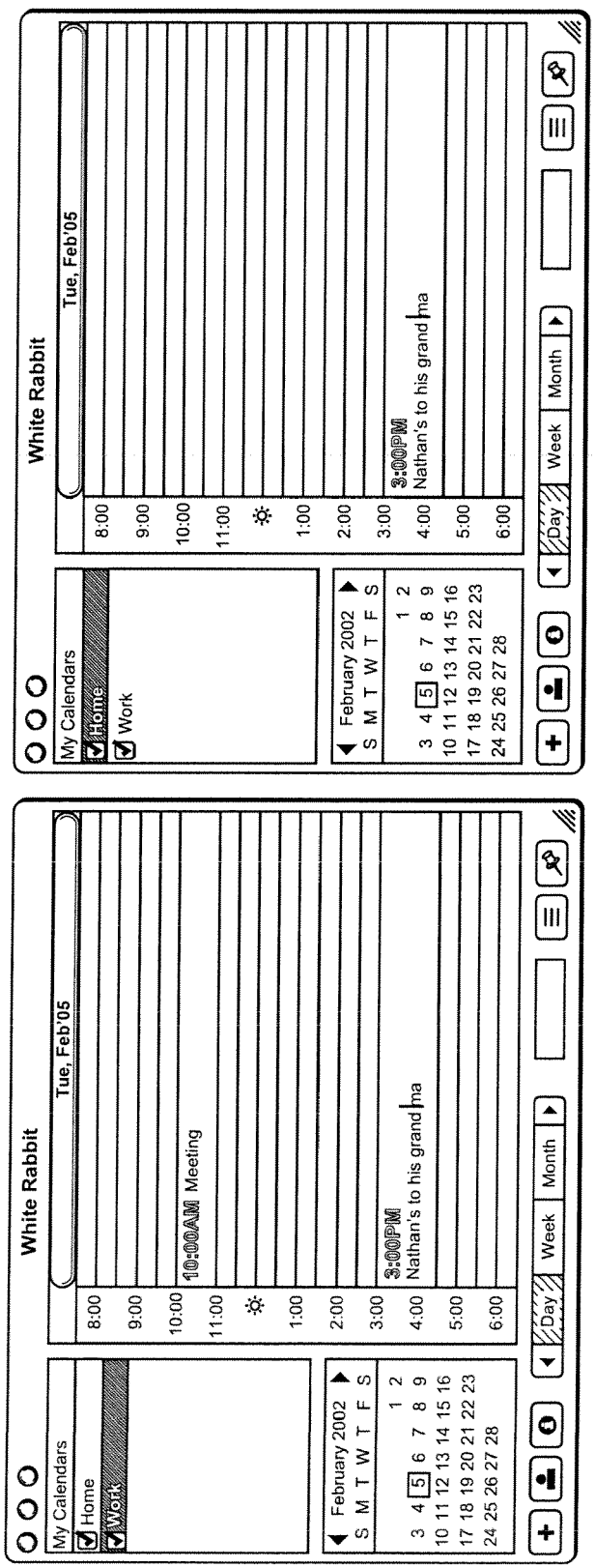
FIG. 13 is a diagram of the user interface of the calendar computer program.
Figure 14:
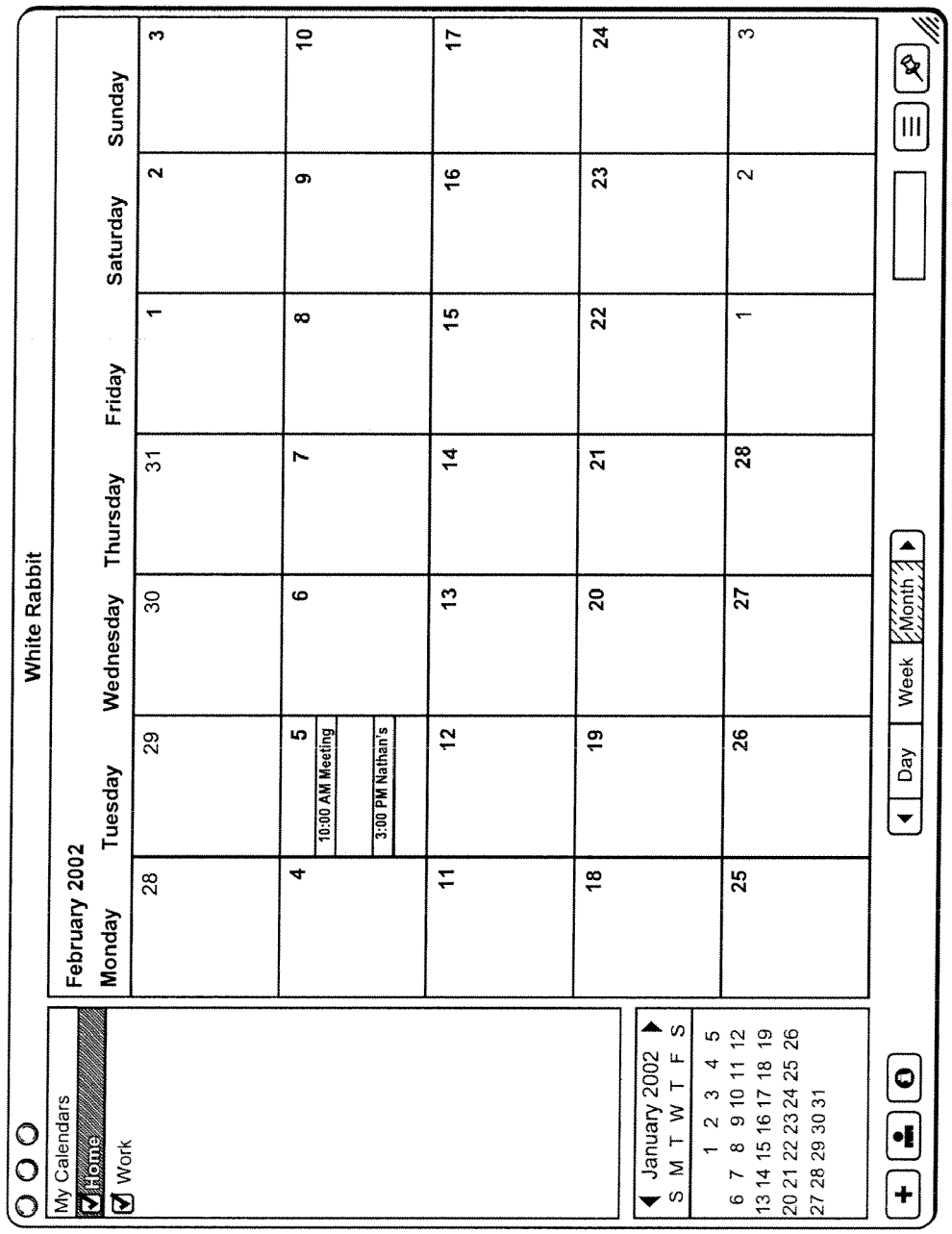
FIG. 14 is a diagram of a user interface of the calendar computer program illustrating a different data range as the primary date range.

Window 600 comprises a primary date range. In FIGS. 12 and 13, the primary date range comprises a day with a data field for each hour. In FIG. 14, the primary date range is a month. Needless to say, the primary date range may be weekly or yearly. A selector 1000 in the user interface enables a user to select which primary date range to display.

The primary date range includes a data field for each unit of the primary date range. That is to say, in the daily date range, the data fields are hours, in the weekly date range, the data fields are days or hours, in the monthly date range, the data fields are days or hours and in the yearly date range, the data fields are months, weeks, days or hours. As shown in FIG. 14, the data fields may display sub-fields for each hour of the day when the primary date range is monthly. Similarly, in the yearly date range, each data field may display sub-fields for each day. In the daily date range, the preferred embodiment displays only some of the hours available.

Window 800 enables a subsidiary date range to be displayed. In FIGS. 12 and 13, the subsidiary date range is monthly. A marker 1200, enables the day selected in the primary date range to be indicated in the subsidiary date range. For example, Tuesday Feb. 5, 2002 is shown in the primary date range and this day is indicated by the marker in the subsidiary date range which displays February 2002.

The user interface provides a toggle or control interface 1400 for each calendar. The user interface indicates to the user that the toggle is activated when a tick or check mark appears next to the name of the calendar. If a toggle is activated, then the events from the respective calendar are displayed by the user interface, typically by displaying the events in a calendar interface such as a daily or weekly or monthly view. FIG. 13, illustrates two situations for the user interface. One situation has the user interface displaying events from two calendars, namely "Home" and "Work" whereas the other situation has the user interface displaying events from only one calendar, namely "Home". For example, in the first situation in FIG. 13, there is an event occurring at 10 am, namely "Meeting" which is not displayed in the other situation since this event only appears in the calendar "Work" which is not activated.

The calendar computer program thus enables a user to manage all of the required calendars having a single user interface and all of the two or more calendars may be calendars for the same user displaying events, meetings, etc. for that user. The user interface significantly enhances the management of the events occurring over a plurality of calendars. Thus, when checking availability of a new event, a user merely needs to activate all of the relevant calendars (leaving the other calendars not activated), and the events in all the relevant (activated) calendars are all displayed and a user can easily confirm whether there is availability. Conversely, when considering just one category of events, a user merely needs to deactivate the redundant calendars and activate only the one relating to the particular category. The user interface thus very efficiently manages the calendars on the one hand by combining all of the calendars and yet allows flexibility to focus on one or a few calendars to minimise confusion and reduce complexity.

In FIGS. 15 to 18, window 800 displays more than one month as the subsidiary date range. Moreover, the marker 1200, indicates a selected week. Window 600 comprises the primary date range of a week with hourly data fields for each day of the week. The user interface indicates a particular day in the primary date range and a detailed marker 1600 in the subsidiary date range indicates the same day. For example, Tuesday 27 Aug. 2002 is highlighted in the primary date range and the detailed marker indicates the same day and this is distinguished from the marker 1200 in the subsidiary date range.

Figure 15:
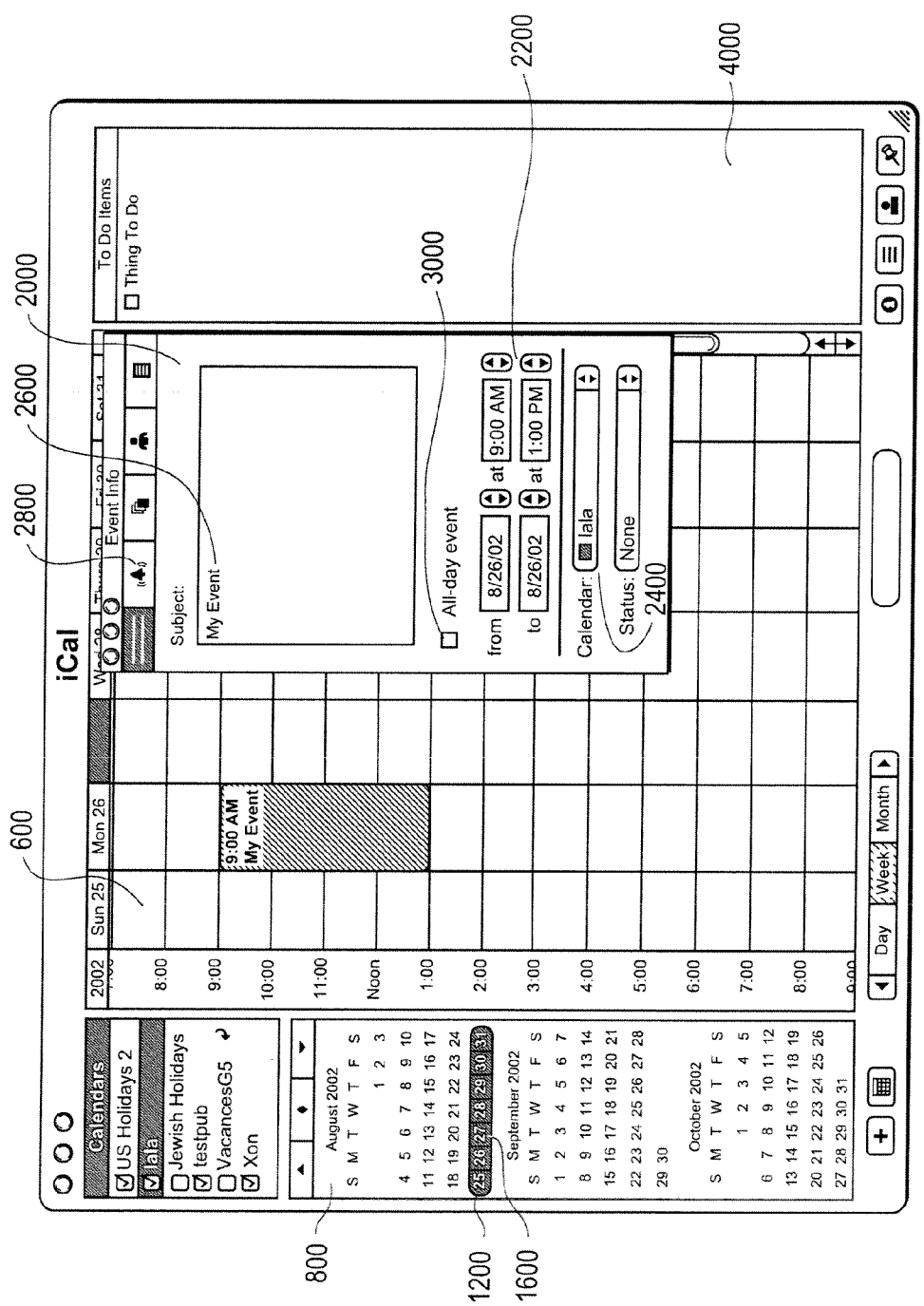
FIG. 15 is a diagram of a user interface of the calendar computer program illustrating the display of events.

FIG. 15 illustrates an event, namely "My Event". The event is displayed as a 2-D shape, namely a rounded rectangle. The 2-D shape has boundaries which are approximately contiguous with the specified duration, namely 9 am to 1 p.m.

In order to minimise confusion, only one of the calendars is selected for editing at any one time. Thus, a user selects a calendar of most importance in the hierarchy of all of the calendars. This is indicated by highlighting in the user interface. For example, as shown in FIG. 15, the calendar "lala" is highlighted, thereby indicating that as the most important calendar.

When a user wishes to add, select, modify or delete an event, the user may highlight the event and double click. An interrogator interface 2000 is activated and displayed. The date of the event and duration are displayed as shown at 2200. Changes can be made using the arrows. The calendar from which the event is taken is also displayed at 2400. The event may be moved from one calendar to another by changing the associated calendar appearing at 2400. The details of the event are displayed at 2600. Not only may the event be changed but also properties associated with the event may be changed. For example, an alarm may be indicated and/or selected at 2800. When the alarm is due, any known computer program alarm may be provided such as an audio or visual announcement. A shortcut 30 may be activated to set the duration as the whole day or other duration depending upon the primary date range used. Another property is to set the event as recurring. A recurring event may comprise for example Birthdays, anniversaries, regular appointments etc.

The user interface shown in FIG. 15 also includes an additional window 4000. Window 4000 is entitled "To Do items". To do items include those tasks for which a specific time is not required but set for a particular day, week, month or year, depending upon the primary date range selected. In FIG. 15, the primary date range is weekly and the to do items are noted for a particular day. To do items can be displayed such as that shown in FIG. 16. The to do items may be implemented in a "Franklin Covey mode".

Figure 17:
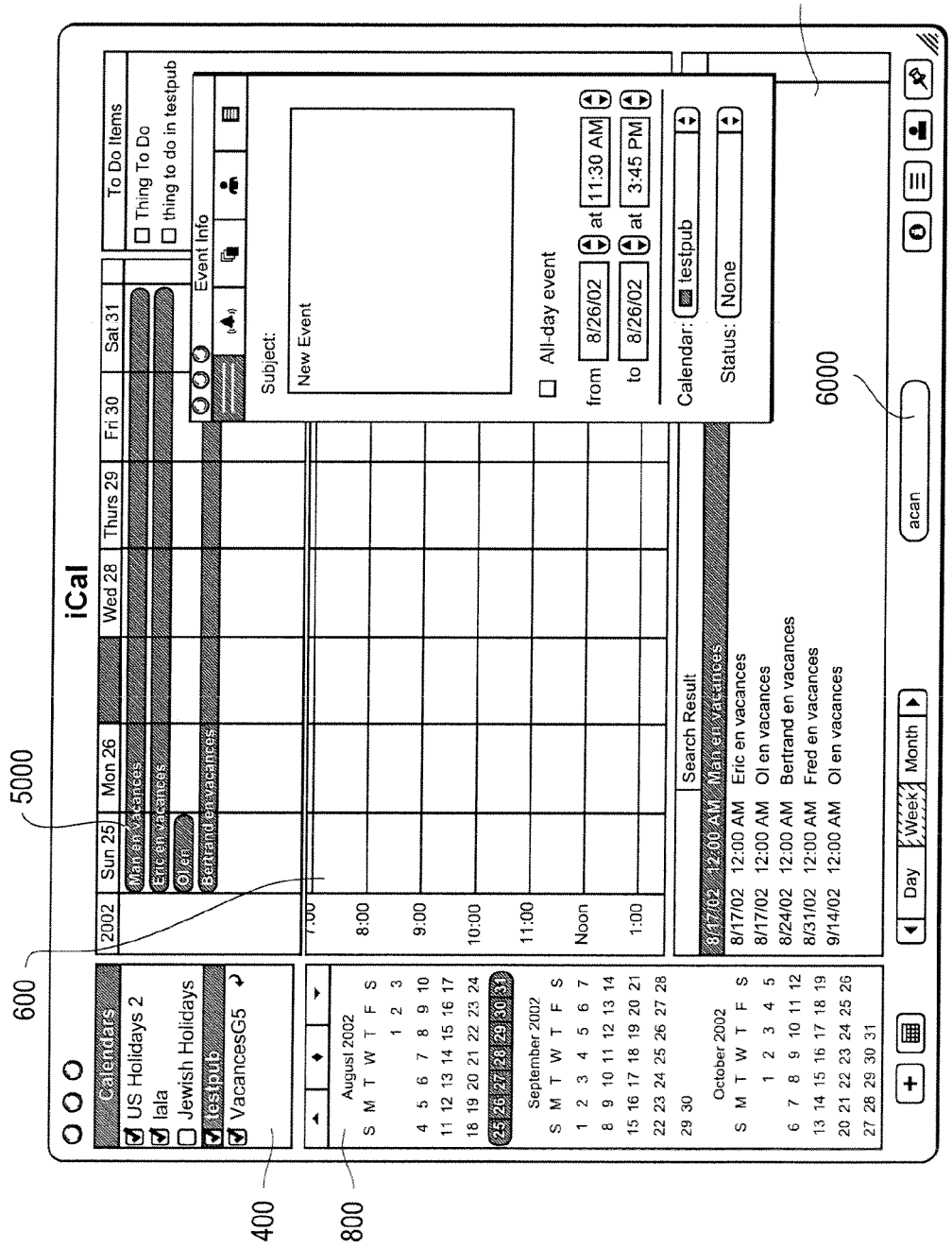
FIG. 17 is a diagram of a user interface of the calendar computer program illustrating a search result window.

FIG. 17 illustrates a user interface with an additional window 5000. Window 5000 provides another subsidiary date range, in this case weekly. The events occurring in window 5000 are generally of a day long duration. Such a display is particularly useful when displaying user's holidays or national holidays or other events of a day duration such as Birthdays. Those events are indicated by a 2-D rectangular shape with rounded corners at the extremities of the duration. Such events are termed banners. A banner may also be used to display a weekend or holiday period. The computer program is able to display such a banner with rectangular corners at the extremity of the duration when the shortcut 30 is activated.

The calendar computer program also provides for searches to be effected. The searches are facilitated by search interface 6000. A string of characters is entered into the search interface. A search is conducted across selected calendars and the search results are displayed in a search result window 6200. For example in FIG. 17, the search string "acan" was entered and various entries identified and displayed. The search interface also enables each of the events presented thereby to be viewed and/or changed and selecting one of the results in the search interface for changing may produce the interrogator interface as discussed above.

Figure 18:
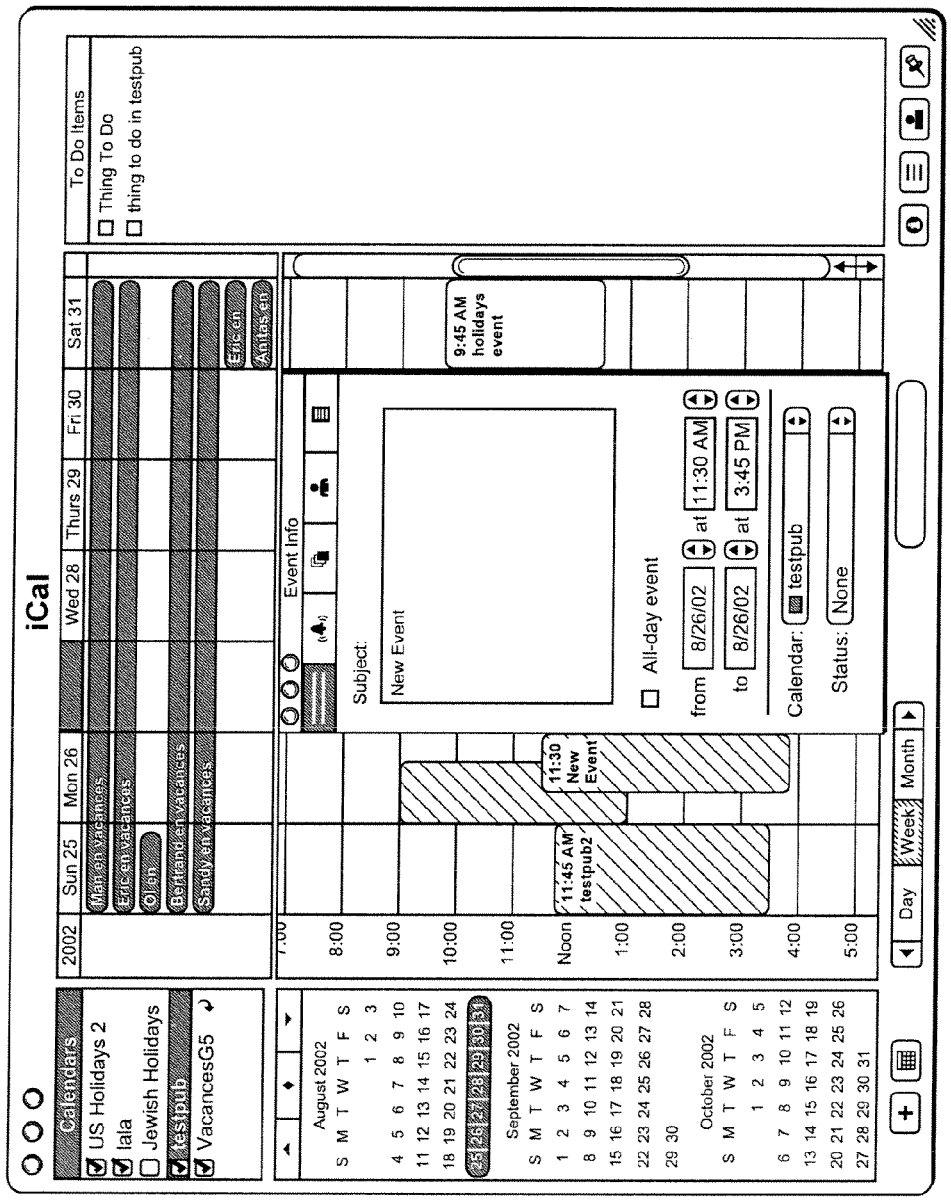
FIG. 18 is a diagram of a user interface of the calendar computer program illustrating overlapping events.
Figure 19:
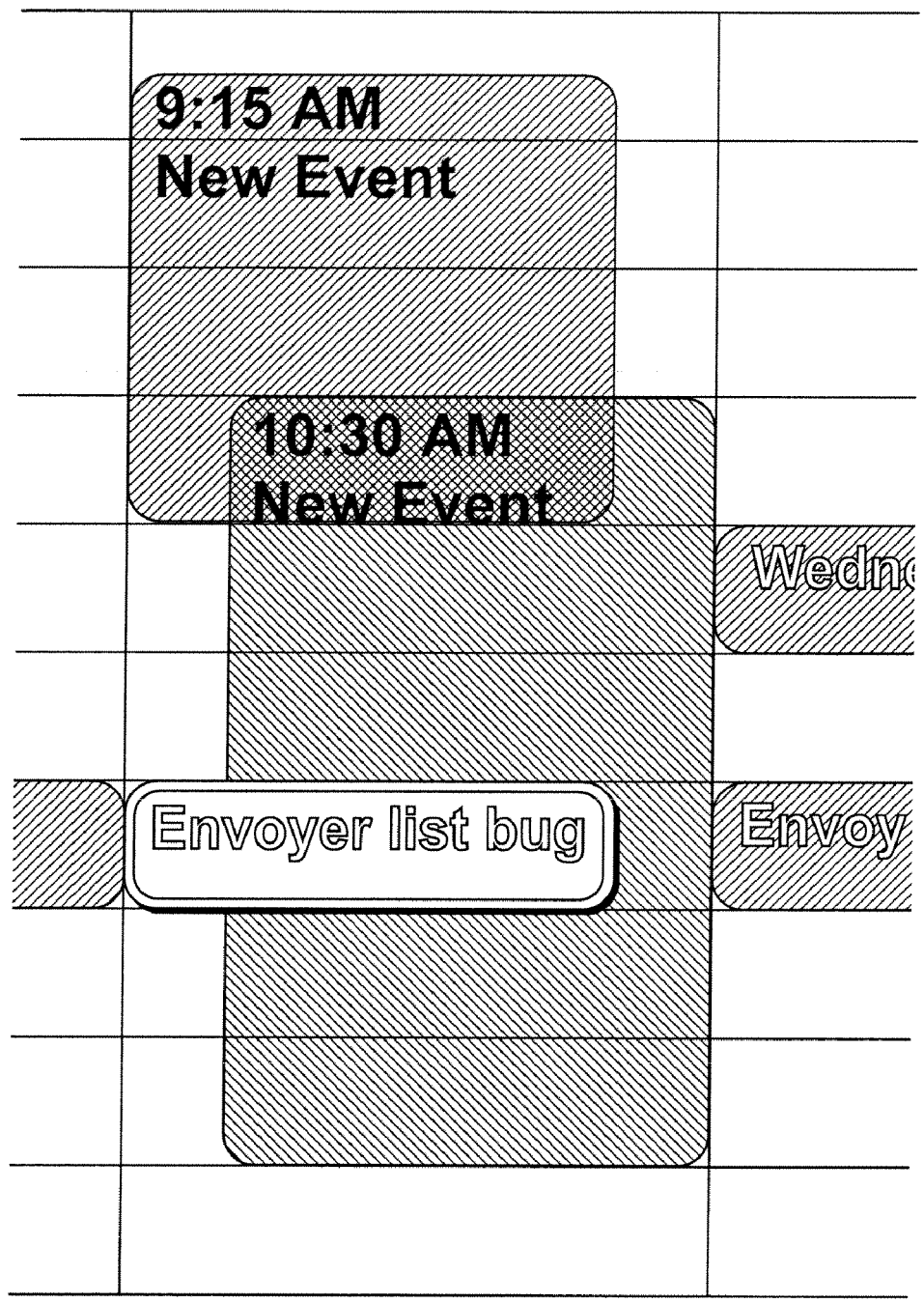
FIG. 19 is a diagram of part of a user interface of the calendar computer program illustrating said overlapping events in more detail.

As discussed above, events from each toggled calendar are displayed by the user interface. FIG. 18 illustrates the user interface whereby several calendars are toggled, namely "U.S. Holidays 2", "lala", "Jewish Holidays", "testpub" and "VacancesG5". The events are shown in the primary date range. It is not uncommon for events to conflict. Thus, a distinguishing feature is provided to distinguish between conflicting events. The distinguishing feature may comprise a different colour, the shape of the event being displayed differently and/or one of the events being translucently displayed. When colour is used, the name of the calendar and each of the events or their shape take the same colour.

In FIG. 18, there are two conflicting events which overlap between 11.30 am and 1 p.m. The events are displayed in a translucent manner and with their shape reduced such that the lateral boundary does not extend the full width of the day data field. FIG. 8 illustrates this in more detail. In this case, there are two conflicting events with the event entitled "New event" at 10.30 am. The other events "New event" at 9.15 am and "envoyer list bug" are reduced in size and aligned with the left perimeter of the day data field whereas the event "New event" at 10.30 am is reduced in size and aligned with the right perimeter of the day data field. Moreover, event "New event" at 1030 am is made translucent so that event "New event" at 9.15 am can be seen there through and event "envoyer list bug" is overlaid.

Two features of embodiments of the calendar computer program are the instant access to data and the natural selection and visualisation of other sources of events. A large multitude of events are possible, in particular because of the calendar computer program's ability to include many calendars within a calendar interface for a user. Thus, it becomes critical for a user to quickly and easily find relevant data in a given context. For example, during work hours, a user must be able to easily find meetings concerning a given project, by selecting only the work calendar and searching for the given project. However, at home, the same user, with the same computer program and user interface must have a way to easily find social details such as the soccer matches for any given team, again through selecting only the relevant calendars and searching for the given team. The user is thus provided with a live textual search system and related navigational facilities.

The calendar computer program thus achieves the objectives of enabling a user to manage all of the required calendars using a computer program having a single user interface. The user interface significantly enhances the management of the events occurring over a plurality of calendars. Thus, when checking availability of a new event, a user merely needs to activate (e.g. "toggle") all of the relevant calendars, whose events are all displayed and a user can easily confirm whether there is availability. Conversely, when considering just one category of events, a user merely needs to deactivate (e.g. "de-toggle") the redundant calendars and activate only the one relating to the particular category. The user interface thus very efficiently manages the calendars on the one hand by combining all of the calendars and yet allows flexibility to focus on one or a few calendars to minimise confusion and reduce complexity.

Figure 20:
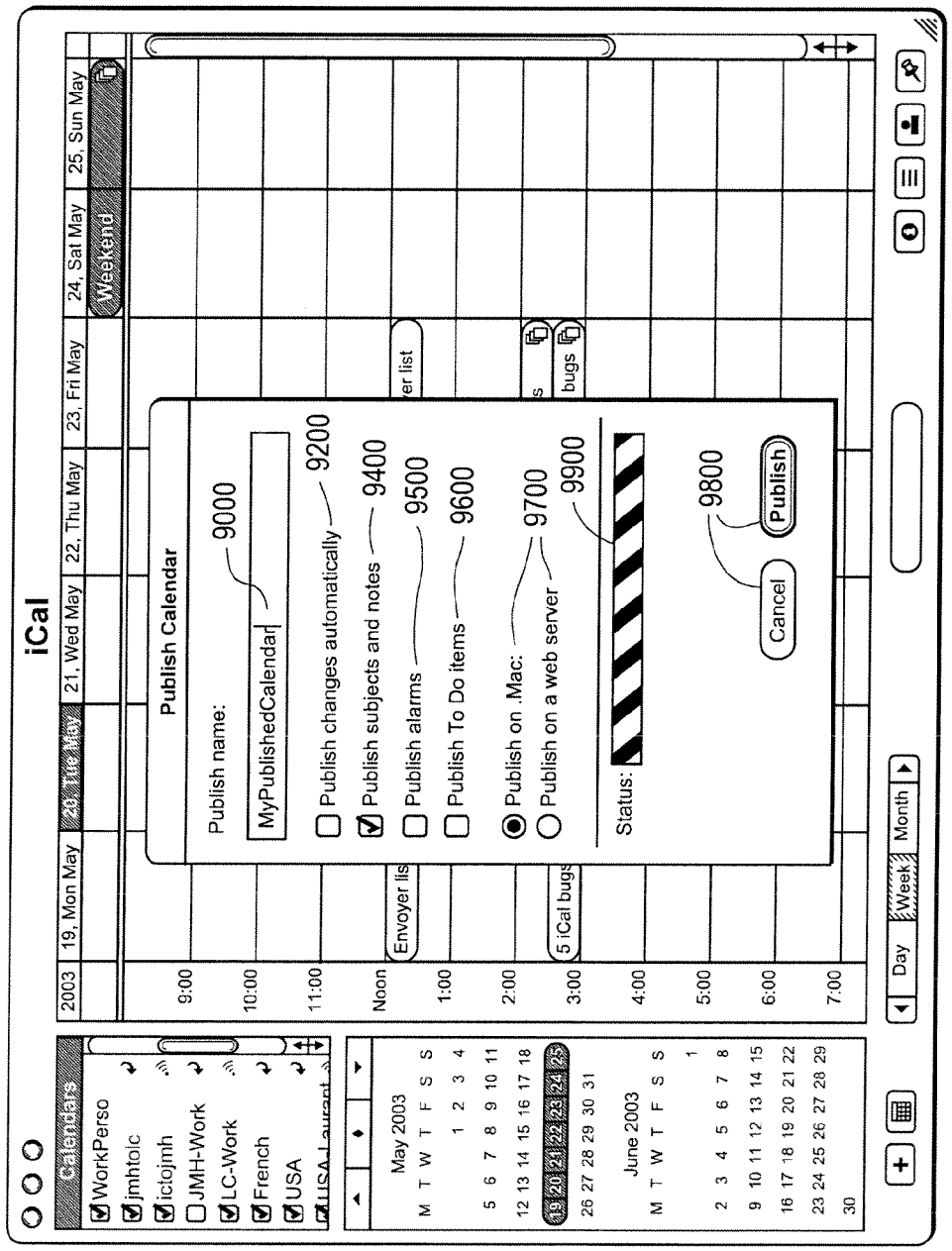
FIG. 20 is a diagram of a publish interface for publishing one of the calendars.

Moreover, the calendar computer program also provides a publish and subscribe user interface for providing one or more calendars to others and/or for subscriber to other calendars. FIG. 20 illustrates a publish interface for facilitating the publication of the selected calendar. In the publish interface, one of the calendars is selected at 9000. A user may set preferences associated with the selected published calendar. For example, all changes effected on the calendar are published automatically at 9200. All notes and events are included at 9400. Any alarms set can also be included or not in the published calendar at 9500 since these may not be relevant to a subscriber. Similarly any to do items can be included or not in the published calendar at 9600. Finally, the publish interface enables the calendar to be published either over the Internet or on a server at 9700. Confirmation or cancellation can be effected via buttons 9800. Finally, a status of the publication is indicated at 9900.

The calendar computer program facilitates a large number of events to be managed. Maintaining consistency between the calendar computer program on one device and one stored on another device is imperative. The synchronisation method and computer system for implementing that method thus achieves that consistency with minimum errors being introduced. The present invention is thus particularly advantageous with computer programs such as the calendar computer program as discussed above.

The foregoing description has been given by way of example only and it will be appreciated by a person skilled in the art that modifications can be made without departing from the scope of the present invention.

The invention claimed is:

1. A method of synchronizing three or more electronic devices, said method comprising:

selecting at least one category of record for synchronization;

storing a plurality of changes including a first change and a second change for a first record in a first device of the three or more electronic devices, the first change including a first original value and a first changed value of the first record, the second change including a second original value and a second changed value of the first record, the first record being of the selected category of record;

establishing an electronic connection between the first device and a second device of the three or more electronic devices;

comparing the first original value with a value of a second record in the second device, the second record being of the selected category of record;

determining the second record as a changed record based on the comparison;

changing the value of the changed record in the second device to the second changed value, wherein the first original value is the same as the value of the second record;

deleting the first change stored in the first device;

nominating a store for each device, wherein if the electronic connection is not established with a third device, then said method further comprises:

storing the plurality of changes in a nominated third store; and when said electronic connection is established with said third device, then the method further comprises the following:

comparing the second original value of the second change stored in the nominated third store with a value of a third record in said third device, the third record being of the selected category of record, and the third device being one of the three or more electronic devices;

if the value of the third record in the third device is the same as the second original value of the second chance stored in the nominated third store, then changing the value of the third record in the third device to the second changed value; and deleting the second change from the nominated third store;

detecting if the first changed value of the first change is the same as the second original value of the second change; and compressing the first and the second change to form a compressed change having the first original value of the first change and the second changed value of the second change.

2. A method as claimed in claim 1, in which there are three or more changes suitable for compression.

3. A method as claimed in claim 2, further comprising: specifying a maximum number of changes suitable for compression for each store.

4. A method as claimed in claim 3, further comprising: reaching said maximum number in a reviewed store; deleting all changes in said reviewed store; and copying said changed record to said record in said third device.

5. A method as claimed in claim 1, wherein a third change is stored in the second device for the second record, the third change including a third original value and a third changed value, and wherein if the second original value of the second change is the same as the third original value of the third change but the second changed value of the second change is different from the third changed value of the third change, then passing the second original value, the second changed value, the third original value and the third changed value for conflict resolution.

6. A method as claimed in claim 5, further comprising: displaying to said user said conflict resolution; specifying one of the second changed value and the third changed value as a correct value; and changing the other changed value of the second changed value and the third changed value to the correct value.

7. A method as claimed in claim 1, in which each said electronic device includes a user interface.

8. A method as claimed in claim 7, in which said user interface enables preferences to be allocated.

9. A method as claimed in claim 8, in which said preferences include selecting the categories of records for synchronization, selecting the type of electronic connection, and specifying the maximum number of changes suitable for compression.

10. A method as claimed in claim 9, in which said user interface enables conflicts to be resolved.

11. A method as claimed in claim 10, in which said categories of records include computer programs and data comprising calendar, email, audio, graphic, notes and personal information.

12. A method as claimed in claim 9, in which each of said electronic devices include any one of personal computers, computer servers, personal digital assistants and mobile telephones.

13. A method as claimed in claim 12, in which said electronic connection includes USB, serial ports, firewire, bluetooth, infrared and over the Internet.

14. A computer readable storage medium or media containing executable computer program instructions which when executed by one or more data processing systems causes said systems to perform a method of synchronizing three or more electronic devices, said method comprising:

selecting at least one category of record for synchronization;

storing a plurality of changes including a first change and a second change for a first record in a first device of the three or more electronic devices, the first change including a first original value and a first changed value of the first record, the second change including a second original value and a second changed value of the first record, the first record being of the selected category of record;

establishing an electronic connection between the first device and a second device of the three or more electronic devices;

comparing the first original value with a value of a second record in the second device, the second record being of the selected category of record;

determining the second record as a changed record based on the comparison;

changing the value of the changed record in the second device to the second changed value, wherein the first original value is the same as the value of the second record;

deleting the first change stored in the first device;

nominating a store for each device, wherein if the electronic connection is not established with a third device, then said method further comprises:

storing the plurality of changes in a nominated third store; and when said electronic connection is established with the third device, then the method further comprises the following:

comparing the second original value of the second chance stored in the nominated third store with a value of a third record in the third device, the third record being of the selected category of record, and the third device being one of the three or more electronic devices; and if the value of the third record in the third device is the same as the second original value of the second chance stored in the nominated third store, then changing the value of the third record in the third device to the second changed value; and deleting the second change from the nominated third store;

detecting if the first changed value of the first change is the same as the second original value of the second change; and compressing the first and the second change to form a compressed change having the first original value of the first change and the second changed value of the second change.

15. A computer readable storage medium or media as claimed in claim 14, in which there are three or more changes suitable for compression.

16. A computer readable storage medium or media as claimed in claim 15, said method further comprising:
specifying a maximum number of changes suitable for compression for each store.

17. A computer readable storage medium or media as claimed in claim 16, said method further comprising:
reaching said maximum number in a reviewed store;
deleting all changes in said reviewed store; and
copying said changed record to said record in said third device.

18. A computer readable storage medium or media as claimed in claim 14, wherein a third change is stored in the second device for the second record, the third change including a third original value and a third changed value, and wherein if the second original value of the second change is the same as the third original value of the third change but the second changed value of the second change is different from the third changed value of the third change, then passing the second original value, the second changed value, the third original value and the third changed values for conflict resolution.

19. A computer readable storage medium or media as claimed in claim 18, said method further comprising:
displaying to said user said conflict resolution;
specifying one of the second changed value and the third changed value a s a correct value; and
changing the other changed value of the second changed value and the third changed value to the correct value.

20. A computer readable storage medium or media as claimed in claim 14, in which each said electronic device includes a user interface.

21. A computer readable storage medium or media as claimed in claim 20, in which said user interface enables preferences to be allocated.

22. A computer readable storage medium or media as claimed in claim 21, in which said preferences include selecting the categories of records for synchronization, selecting the type of electronic connection, and specifying the maximum number of changes suitable for compression.

23. A computer readable storage medium or media as claimed in claim 22, in which said user interface enables conflicts to be resolved.

24. A computer readable storage medium or media as claimed in claim 23, in which said categories of records include computer programs and data comprising calendar, email, audio, graphic, notes and personal information.

25. A computer readable storage medium or media as claimed in claim 22, in which each of said electronic devices include any one of personal computers, computer servers, personal digital assistants and mobile telephones.

26. A computer readable storage medium or media as claimed in claim 25, in which said electronic connection includes USB, serial ports, firewire, bluetooth, infrared and over the Internet.

27. An apparatus for synchronizing three or more electronic devices, said apparatus comprising:
means for selecting at least one category of record for synchronization;
means for storing a plurality of changes including a first change and a second change for a first record in a first device of the three or more electronic devices, the first change including a first original value and a first changed value of the first record, the second change including a second original value and a second changed value of the first record, the first record being of the selected category of record;
means for establishing an electronic connection between the first device and a second device of the three or more electronic devices;
means for comparing the first original value with a value of a second record in the second device, the second record being of the selected category of record;
means for determining the second record as a changed record based on the comparison;
means for changing the value of the changed record in the second device to the second changed value, wherein the first original value is the same as the value of the second record;
means for deleting the first change stored in the first device;
means for nominating a store for each device, wherein if the electronic connection is not established with a third device, then said apparatus further comprises:
means for storing the plurality of changes in a nominated third store; and
means for comparing the second original value of the second change stored in the nominated third store with a value of a third record in said third device, the third record being of the selected category of record, and the third device being one of the three or more electronic devices;
means for changing the value of the third record in the third device to the second changed value if the value of said record in the third device is the same as the second original value of the second change stored in the nominated third store; and
means for deleting the change from the nominated third store;
means for detecting if the first changed value of the first change is the same as the second original value of the second change; and
means for compressing the first and the second change to form a compressed change having the first original value of the first change and the second changed value of the second change.

* * * * *